US011422150B2

(12) United States Patent
Snyder et al.

(10) Patent No.: US 11,422,150 B2
(45) Date of Patent: Aug. 23, 2022

(54) AIRCRAFT AIRFLOW SENSOR HAVING ERROR CORRECTION BASED ON AIRCRAFT MOVEMENT AND PROCESS OF CORRECTING AN AIRCRAFT AIRFLOW SENSOR OUTPUT BASED ON AIRCRAFT MOVEMENT

(71) Applicant: Aerosonic LLC, Clearwater, FL (US)

(72) Inventors: Rick Snyder, Clearwater, FL (US); Charles Lang, Clearwater, FL (US)

(73) Assignee: AEROSONIC LLC, Clearwater, FL (US)

( * ) Notice: Subject to any disclaimer, the term of this patent is extended or adjusted under 35 U.S.C. 154(b) by 0 days.

(21) Appl. No.: 17/007,364

(22) Filed: Aug. 31, 2020

(65) Prior Publication Data

US 2021/0063431 A1 Mar. 4, 2021

Related U.S. Application Data

(60) Provisional application No. 62/894,069, filed on Aug. 30, 2019.

(51) Int. Cl.
*G01P 13/02* (2006.01)
*B64F 5/60* (2017.01)
*G01C 23/00* (2006.01)
*G01P 5/14* (2006.01)
*G01P 15/00* (2006.01)

(52) U.S. Cl.
CPC ............ *G01P 13/025* (2013.01); *B64F 5/60* (2017.01); *G01C 23/00* (2013.01); *G01P 5/14* (2013.01); *G01P 15/00* (2013.01)

(58) Field of Classification Search
None
See application file for complete search history.

(56) References Cited

U.S. PATENT DOCUMENTS

| 3,665,760 | A | 5/1972 | Pitches et al. |
| 6,273,370 | B1 | 8/2001 | Colgren |
| 6,561,020 | B2 * | 5/2003 | Glenney ............. G05D 1/0204 73/170.02 |

(Continued)

OTHER PUBLICATIONS

International Search Report and Written Opinion issued in PCT/US2020/048738, dated Dec. 1, 2020.

(Continued)

*Primary Examiner* — Peter J Macchiarolo
*Assistant Examiner* — Jermaine L Jenkins
(74) *Attorney, Agent, or Firm* — BakerHostetler

(57) ABSTRACT

An aircraft airflow sensor probe configured to correct measurements based on aircraft movement includes a vane assembly configured to sense a direction of local airflow outside an aircraft, at least one accelerometer configured to detect aircraft movement, a sensor configured to sense and output a rotational position of the vane assembly, and an angle of attack processor configured to determine at least a measured angle of attack of the aircraft based on the rotational position of the vane assembly. The angle of attack processor further configured to determine a correction value based on the aircraft movement data provided by the at least one accelerometer and output a corrected angle of attack of the aircraft.

20 Claims, 23 Drawing Sheets

(56) References Cited

U.S. PATENT DOCUMENTS

| | | | | |
|---|---|---|---|---|
| 6,612,166 | B2* | 9/2003 | Golly | G01P 13/025 |
| | | | | 73/861.74 |
| 8,695,412 | B2* | 4/2014 | Mandle | G01M 9/06 |
| | | | | 73/147 |
| 9,753,051 | B2* | 9/2017 | Schegerin | G01P 5/16 |
| 11,029,706 | B2* | 6/2021 | Li | G01P 13/025 |
| 2004/0261518 | A1 | 12/2004 | Seidel et al. | |
| 2016/0356175 | A1* | 12/2016 | Waddington | G01P 5/165 |
| 2018/0299293 | A1* | 10/2018 | Ell | G01C 23/00 |
| 2019/0242924 | A1* | 8/2019 | Lang | G01P 5/165 |
| 2019/0383639 | A1 | 12/2019 | Naslund et al. | |

OTHER PUBLICATIONS

Thacker "Use of State Estimation to Calculate Angle-of-Attack Position Error from Flight Test Data" Air Force Institute of Technology, Oct. 1985; Retrieved from <URL:https: //apps.dtic.mil/dtic/tr/fulltexVu2/a163962.pdf> 104 pages.

"Pitot-Static Tube" Prandtl Tube, Glenn Research Center, (NASA), Nov. 2015; Retrieved from <URL:https://web.archive.org/web/20151105124557/https://www .grc.nasa.gov/WWW/K-12/airplane/pitot.html> 2 pages.

* cited by examiner

AIRCRAFT AIRFLOW SENSOR HAVING ERROR CORRECTION BASED ON AIRCRAFT MOVEMENT AND PROCESS OF CORRECTING AN AIRCRAFT AIRFLOW SENSOR OUTPUT BASED ON AIRCRAFT MOVEMENT

CROSS-REFERENCE TO RELATED APPLICATIONS

This application claims the benefit of U.S. Provisional Application No. 62/894,069 filed on Aug. 30, 2019, which is hereby incorporated by reference in its entirety for all purposes as if fully set forth herein.

FIELD OF THE DISCLOSURE

The disclosure relates to an aircraft airflow sensor probe and a process of implementing an aircraft sensor probe utilizing error correction. More particularly, the disclosure relates to an aircraft airflow sensor probe and a process of implementing an aircraft sensor probe having increased accuracy by utilizing error correction based on aircraft movement.

BACKGROUND OF THE DISCLOSURE

In some typical implementations, an aircraft airflow sensor determines angle of attack (AOA) by sensing a direction of local airflow with a vane. The aircraft airflow sensor is typically mounted on a fuselage of an aircraft and extends through the aircraft fuselage. The angular position of the vane of the aircraft airflow sensor is converted to an electrical output by an angular sensor.

An aircraft airflow sensor typically includes a counterweight inside the aircraft airflow sensor (and inside the aircraft) to balance out a mass of the vane. Due to this configuration, the counterweight, which typically has an equal and opposite moment to that of the vane, is closer to a centerline of the aircraft than the vane. In some cases, the counterweight, may or may not have the same mass as the vane. The vane and counterweight of the aircraft airflow sensor are typically balanced so that the airflow can more easily move the vane so that the vane is aligned with the airstream and the aircraft airflow sensor can determine and report sensor readings, such as an angle of attack (AOA) to that airstream.

However, there is a problem with the aircraft airflow sensor reporting accurate sensor readings when the aircraft is operating outside a steady-state envelope. For example, when the aircraft conducts a pitch maneuver, a roll maneuver, and/or the like with a relatively high angular acceleration. In this regard, a difference in a moment arm between the counterweight and the vane induces a force on the vane different from the force on the counterweight causing the vane to not properly report measurements, such as the angle of attack (AOA) to the airstream. The problem may be worse when the aircraft is experiencing high G forces and low speed. For example, when the aircraft is performing maneuvers subject to high G forces while operating at a low speed such as the top of a loop, a low forward speed roll maneuver, various air combat maneuvers, and/or the like.

Accordingly, what is needed is an aircraft airflow sensor probe that is more accurate during aircraft maneuvers that include high G forces and/or a low speed.

SUMMARY OF THE DISCLOSURE

The foregoing needs are met, to a great extent, by the disclosure, wherein in one aspect a technique and apparatus are provided for an aircraft airflow sensor probe that is more accurate during aircraft maneuvers that include high G forces and/or low speed.

One aspect includes an aircraft airflow sensor probe that includes a vane assembly configured to sense a direction of local airflow outside an aircraft; a shaft configured to rotatably hold the vane assembly and allow rotational movement of the vane assembly; at least one accelerometer configured to detect aircraft movement; a sensor configured to sense and output a rotational position of the vane assembly; an angle of attack processor configured to determine at least a measured angle of attack of the aircraft based on the rotational position of the vane assembly; the at least one accelerometer configured to provide aircraft movement data to the angle of attack processor; and the angle of attack processor further configured to determine a correction value based on the aircraft movement data provided by the at least one accelerometer and output a corrected angle of attack of the aircraft.

One aspect includes a process of implementing an aircraft airflow sensor probe that includes configuring an aircraft with a vane assembly; allowing rotational movement of the vane assembly with a shaft configured to rotatably hold the vane assembly; sensing a direction of local airflow outside the aircraft with the vane assembly; detecting aircraft movement with at least one accelerometer; sensing and outputting a rotational position of the vane assembly with a sensor; determining at least a measured angle of attack of the aircraft based on the rotational position of the vane assembly with an angle of attack processor; providing aircraft movement data to the angle of attack processor with the at least one accelerometer; and determining a correction value based on the aircraft movement data provided by the at least one accelerometer and outputting a corrected angle of attack of the aircraft with the angle of attack processor.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
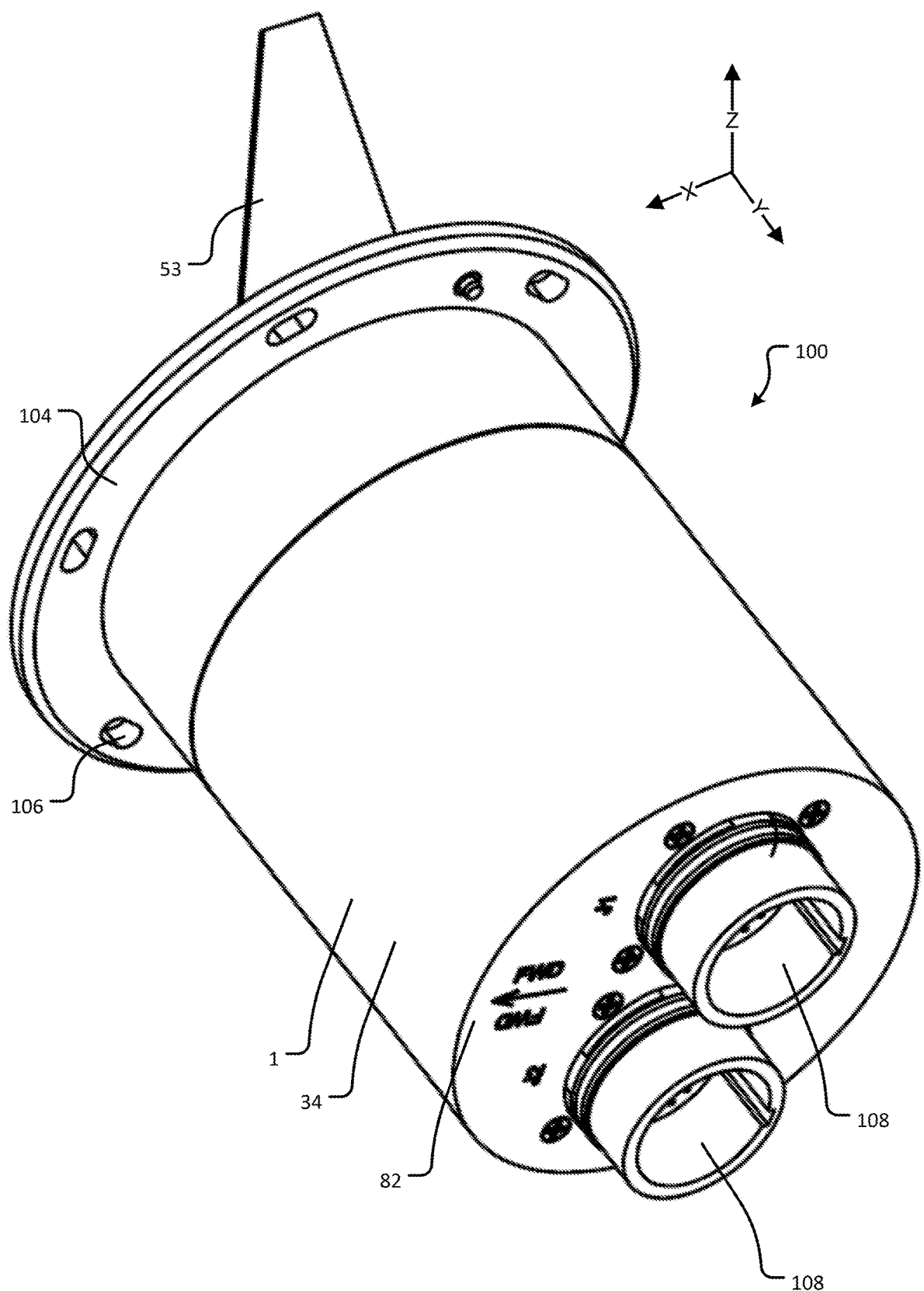
FIG. 1 illustrates a backside perspective view an aircraft airflow sensor probe according to the disclosure.

The disclosure will now be described with reference to the drawing figures, in which like reference numerals refer to like parts throughout. Aspects of the disclosure advantageously provide an aircraft airflow sensor probe that is more accurate during aircraft maneuvers that include for example high G forces and/or a low speed.

The disclosure includes a number of approaches to correct errors to provide an aircraft airflow sensor probe that is more accurate. Moreover, the disclosure includes a number of approaches to correct errors to provide an aircraft airflow sensor probe that is more accurate during aircraft maneuvers that include high G forces and/or a low speed.

As described in greater detail in the disclosure, there are two ways to make a correction, compute and transmit a new angle, or use a motor to compensate for a moment imbalance. In one approach, the AOA sensor adjusts a reported angle, not the vane position. In another approach, the AOA sensor adjusts a vane position using a motor to compensate for a moment imbalance. Accordingly, the AOA sensor may operate with a motor or without a motor. In one aspect, accelerometers may monitor aircraft pitch and/or roll rates continuously but may not apply a correction until the rates exceed a threshold small enough that applying the correction does not cause a step change in reported angle. The correction may be applied until the aircraft pitch and/or roll rates drop below a cut off threshold. At this point, there may be some error between a corrected AOA and an actual value. To overcome the error without causing a step change in reported angle, the angle reported by the sensor may extrapolate the corrected trend until it intersects an actual AOA.

Alternatively, the reported angle may always be corrected for angular acceleration and an error correction algorithm may be utilized to remove integration error periodically as needed.

Figure 2:
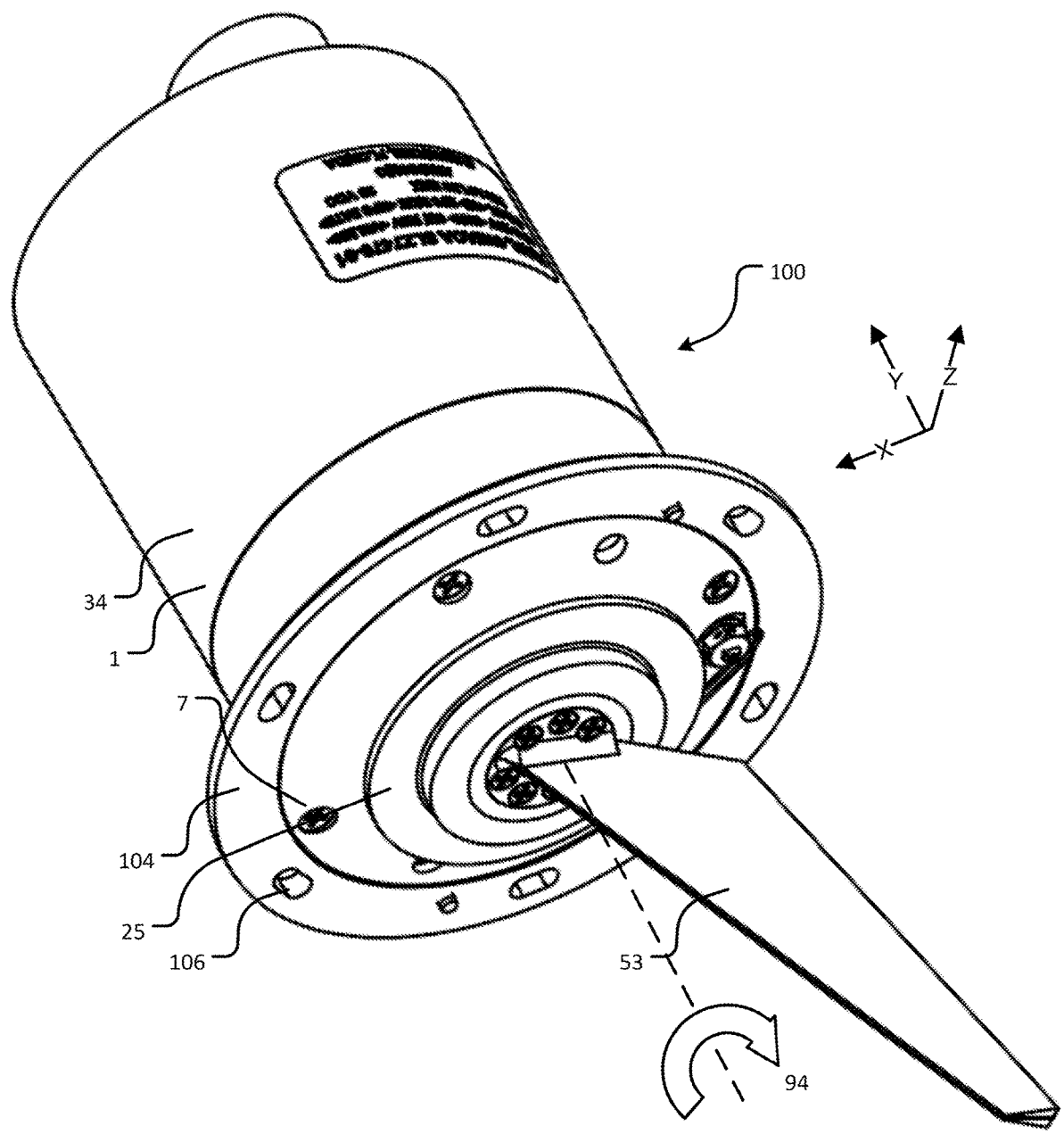
FIG. 2 illustrates a front side perspective view of the aircraft airflow sensor probe according to FIG. 1.

FIG. 1 illustrates a backside perspective view an aircraft airflow sensor probe according to the disclosure; and FIG. 2 illustrates a front side perspective view of the aircraft airflow sensor probe according to FIG. 1.

In particular, FIG. 1 and FIG. 2 illustrate an aircraft airflow sensor probe 100 configured as an angle of attack sensor to provide normalized angle of attack (AOA) information for flight control systems and/or a pilot. In one aspect, the aircraft airflow sensor probe 100 may be configured as a Stall Warning Transmitter (SWT) to provide stall protection functionality for flight control systems. In some aspects, the Stall Warning Transmitter (SWT) may be an angular position transmitter configured to operate with a stall warning computer. In some aspects, the Stall Warning Transmitter (SWT) may be an angular position transmitter implemented with an integrated stall warning computer. Other implementations of the aircraft airflow sensor probe 100 are contemplated as well.

In one aspect, the aircraft airflow sensor probe 100 may be a vane-type sensor. In one aspect, the aircraft airflow sensor probe 100 may be a forward-fuselage mounted sensor. In one aspect, the aircraft airflow sensor probe 100 may be electrically anti-iced. In one aspect, the aircraft airflow sensor probe 100 may be a vane-type, forward-fuselage mounted, electrically anti-iced, sensor. Other configurations and/or implementations of the aircraft airflow sensor probe 100 may be utilized as well. In this regard, aspects that are electrically anti-iced may be implemented with a heater or heating device incorporated into the vane assembly 53 and/or the aircraft airflow sensor probe 100 such as the heater blanket 5 illustrated in FIG. 7.

When mounted in the aircraft, the aircraft airflow sensor probe 100 may include a vane assembly 53 that extends perpendicular to the aircraft skin in order to sense the angular direction of the local airstream. In one aspect, the vane assembly 53 may rotate to remain continuously aligned with the local airstream during most flight operations as illustrated by the dashed line and arrow 94 shown in FIG. 2. In one aspect, the vane assembly 53 may be connected to an angular position sensor 10, which converts the rotational position and/or motion of the vane assembly 53 to an electrical signal as described below and illustrated in FIG. 3.

In one aspect, the aircraft airflow sensor probe 100 may include a main housing assembly 1. In one aspect, the main housing assembly 1 may include a rear cover 34 that may be arranged internally within the aircraft. In one aspect, the main housing assembly 1 may include a back cover 82 that may be arranged internally within the aircraft. In one aspect, the main housing assembly 1 may include a water intrusion guard 25 that may be arranged externally to the aircraft. In one aspect, the main housing assembly 1 may include a front cover 7 that may be arranged externally to the aircraft.

The main housing assembly 1 that may include the rear cover 34, the water intrusion guard 25, the back cover 82, and the front cover 7 may be implemented as a protective case for the aircraft airflow sensor probe 100. In one aspect, the main housing assembly 1 may be hermetically sealed to prevent intrusion of foreign objects. In one aspect, the main housing assembly 1 may be waterproof, watertight, and/or water resistant to prevent intrusion of water and other liquids present in the environment of the main housing assembly 1 and the aircraft. In this regard, the main housing assembly 1 may include one or more seals, gaskets, adhesives, waterproof coatings, potting materials, and/or the like. These aspects may be implemented for applications in extreme outdoor environments for protection of the aircraft airflow sensor probe 100. Additionally, the main housing assembly 1 may include additional and/or alternative water management systems to ensure the main housing assembly 1 may be waterproof, watertight, and/or water resistant to prevent intrusion of water and other liquids present in the environment of the main housing assembly 1 and the aircraft.

In one aspect, the aircraft airflow sensor probe 100 may include a flange 104 on the main housing assembly 1 for attachment to the aircraft. In one aspect, the flange 104 may include flange apertures 106 configured to receive one or more mechanical fasteners for fastening the flange 104 and the aircraft airflow sensor probe 100 to the aircraft. However, the aircraft airflow sensor probe 100 may include other types of construction for fastening to the aircraft. In one aspect, the aircraft airflow sensor probe 100 may include a clamp configuration to clamp the flange 104 of the aircraft airflow sensor probe 100 to the aircraft. In this regard, the vane assembly 53 of the aircraft airflow sensor probe 100 may extend externally from the aircraft and the rear cover 34 and the back cover 82 may be arranged internally within the aircraft.

In one aspect, the aircraft airflow sensor probe 100 may include signal connections 108 on the main housing assembly 1 and/or the rear cover 34. In one aspect, the signal connections 108 may be connected to the aircraft to provide sensor readings and/or the like to the aircraft. In one aspect, the signal connections 108 may be electrical connections. In one aspect, the signal connections 108 may be optical connections. In one aspect, the signal connections 108 may be electrical and/or optical connections. In one aspect, the signal connections 108 may also receive aircraft configuration signals for operating the aircraft airflow sensor probe 100 from the aircraft. In one aspect, the signal connections 108 may also receive sensor readings for operating the aircraft airflow sensor probe 100 from the aircraft. In one aspect, the signal connections 108 may also receive power for operating the aircraft airflow sensor probe 100 from the aircraft.

As further described below, the aircraft airflow sensor probe 100 may include one or more accelerometers within the main housing assembly 1. In other aspects, the one or more accelerometers may be located elsewhere in the aircraft and provide sensor output that may be input to the aircraft airflow sensor probe 100. The one or more accelerometers may sense aircraft movement such as pitch, pitch rate, pitch rate acceleration, roll position, roll rate, roll rate acceleration, yaw position, yaw rate, yaw rate acceleration, and/or the like. In one aspect, the one or more accelerometers may sense aircraft movement that includes a pitch rate and/or a roll rate of the aircraft. In one aspect, the one or more accelerometers may sense aircraft movement that includes a pitch rate and a roll rate of the aircraft. In particular aspects, the aircraft airflow sensor probe 100 may measure local acceleration at two points along an axis. The difference in these acceleration magnitudes implies a difference in acceleration at a center of gravity of the vane assembly 53 and the center of gravity of the counterweight 15 as further described herein. If a line between the two accelerometers is parallel to the axis of the vane assembly 53, the computation may be somewhat simpler than if it is not. From this, an angle error can be computed if the aerodynamic force on the vane is known. The correction may not possible without an estimate of the aerodynamic force on the vane assembly 53.

In one aspect, the one or more accelerometers may include at least two accelerometers. In this aspect, a pitch rate and/or a roll rate of the aircraft may be determined based on a difference in acceleration sensed between the two accelerometers and may output values associated with a pitch rate and/or a roll rate of the aircraft.

In one aspect, the one or more accelerometers may include four accelerometers. In this aspect, a pitch rate and/or a roll rate of the aircraft may be determined based on a difference in acceleration sensed between two of the four accelerometers and output values associated with a pitch rate and/or a roll rate of the aircraft. Other numbers of accelerometers are contemplated as well.

Based on the pitch rate and/or a roll rate of the aircraft, a correction factor may be generated. The correction factor may then be applied to a measured angle of attack (AOA) measured by an angular position sensor 10 responsive to the vane assembly 53 of the aircraft airflow sensor probe 100. In this regard, the correction factor may be a function of a pitch rate and/or a roll rate of the aircraft. The pitch rate and/or the roll rate of the aircraft may be applied to a calibration table, algorithm, lookup table, and/or the like to generate the correction factor that may be added/subtracted from the measured angle of attack (AOA) measurement from the angular position sensor 10 responsive to the vane assembly 53. In one aspect, the calibration table, algorithm, lookup table, and/or the like may be stored in the memory of the AOA processor 28.

In further aspects, the aircraft airflow sensor probe 100 may also sense airspeed with an air pressure sensor 80 as described below and illustrated in FIG. 8 and FIG. 15. Based on the pitch rate and/or the roll rate of the aircraft as well as the airspeed, a correction factor may be generated. In this regard, as airspeed increases, the aerodynamic forces on the vane assembly 53 may help alleviate the rotational force and help the vane assembly 53 to properly align with the airstream. The correction factor taking into consideration the airspeed and associated aerodynamic forces may then be applied to a measured angle of attack (AOA) measured by the angular position sensor 10 responsive to the vane assembly 53 of the aircraft airflow sensor probe 100. In this regard, the correction factor may be a function of a pitch rate and/or a roll rate of the aircraft as well as the airspeed. The pitch rate and/or the roll rate of the aircraft as well as the airspeed may be applied to a calibration table, algorithm, lookup table, and/or the like that generates the correction factor that may be added/subtracted from the measured angle of attack (AOA) measurement from the angular position sensor 10 responsive to the vane assembly 53. In further aspects, the correction factor may be a function of additional aircraft maneuvers sensed by the one or more accelerometers as well as other physical parameters associated with the current state of the aircraft within a flight envelope.

Figure 3:
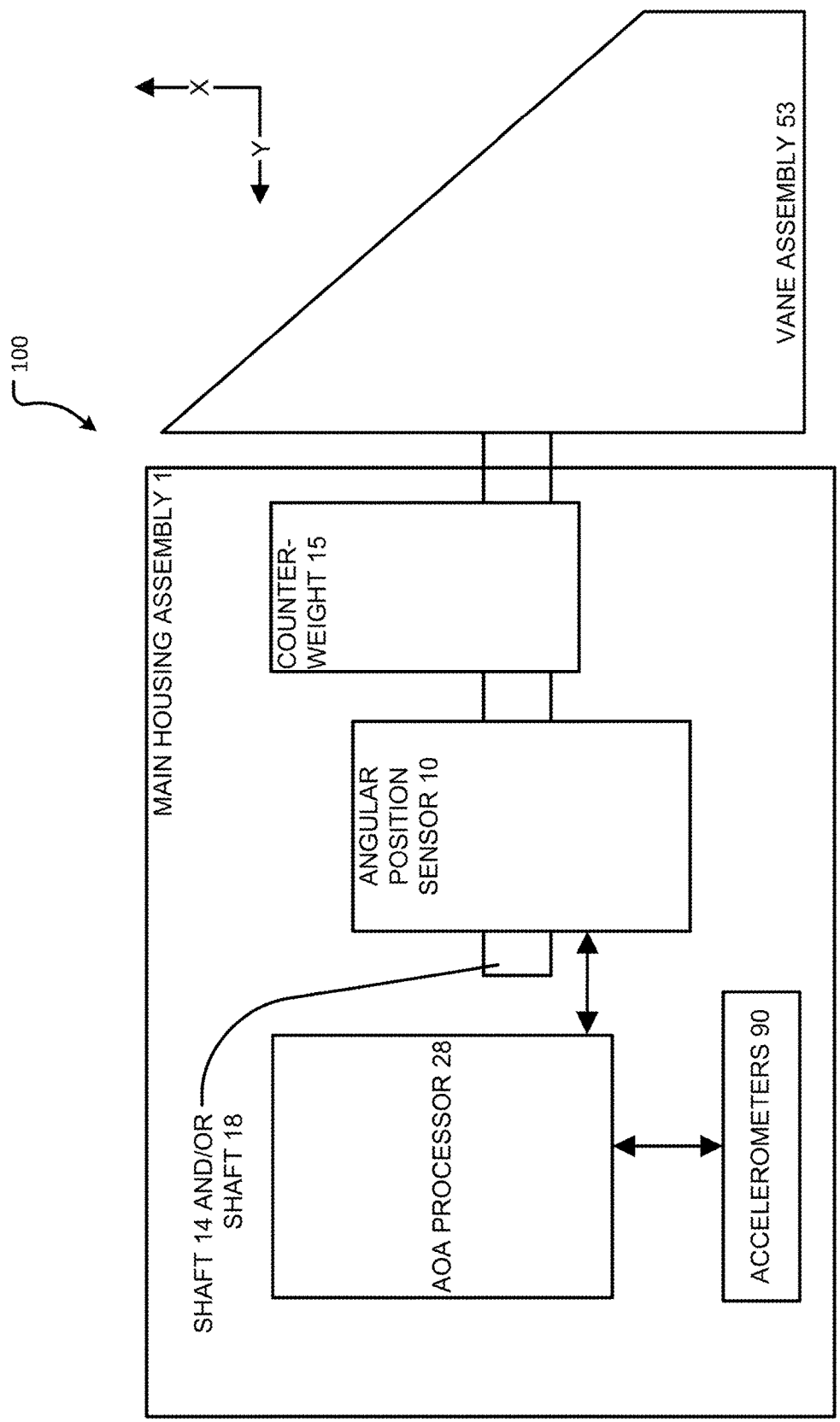
FIG. 3 illustrates a schematic of the aircraft airflow sensor probe according to the disclosure.

FIG. 3 illustrates a schematic of the aircraft airflow sensor probe according to the disclosure.

In one aspect, the vane assembly 53 may be connected to an angular position sensor 10, which converts the rotational position and/or motion of the vane assembly 53 to an electrical signal. The angular position sensor 10 may be used to measure the angular displacement of the vane assembly 53 with respect to the airflow. The angular position sensor 10 may provide a measured angle of attack, an indicated angle of attack, a normalized angle of attack, an actual local flow angle, and/or the like. In this regard, the displacement of the vane assembly 53 may be with respect to an aircraft mechanical reference. The normalized angle of attack (AOA) may be computed from the local flow angle based on a knowledge of the aircraft configuration and stall characteristics. The vane assembly 53 may always be aligned with the airflow except during some aircraft maneuvers as described herein.

In one aspect, the angular position sensor 10 may be a Rotary Variable Differential Transformer (RVDT), which converts the rotational motion of the vane assembly 53 to an electrical signal. The RVDT may be implemented as an electromechanical transducer that may provide a variable output voltage that is linearly proportional to the angular displacement of an input shaft. A single RVDT may be provided for measuring the vane angle (free airstream) with respect to the centerline of the aircraft. In another aspect, the angular position sensor 10 may be implemented as a Rosemount sensor that may utilize revolvers and/or synchros to detect angular displacement. In this aspect, the revolvers may be connected through gears to a vane shaft such as a shaft 14 and/or a shaft 18 of the vane assembly 53. In another aspect, the angular position sensor 10 may be implemented as one or more potentiometers to detect angular displacement. This measurement may be used by the aircraft airflow sensor probe 100 to calculate the measured angle of attack (AOA). Additionally, this measurement may be used by the aircraft airflow sensor probe 100 to calculate a rate of change of the angle of attack (AOA). In other aspects, the angular position sensor 10 may be a rotary encoder, an angular transducer, a linear transducer configured to measure rotary motion, and/or the like. In further aspects, a plurality of angular position sensors 10 may be utilized on the same shaft in order to provide redundancy, increase accuracy, and/or the like. In some aspects, the angular position sensor 10 may be configured on and/or connected to a circuit board, a laminated substrate, a printed circuit board (PCB), a printed wire assembly, a surface that mechanically supports and electrically connects the various electronic components or electrical components, and/or the like within the aircraft airflow sensor probe 100.

With further reference to FIG. 3, the aircraft airflow sensor probe 100 may include a main housing assembly 1 that supports the vane assembly 53. More specifically, the vane assembly 53 may be supported by one or more shafts in order to rotate and sense the airflow past the vane assembly 53. In one aspect, the shafts may include a shaft 14 and/or a shaft 18.

In one aspect, the aircraft airflow sensor probe 100 may include an angle of attack (AOA) processor, 28 and/or other processor that may utilize the angular position sensor 10 output signal and may calculate the desired output parameters. In one aspect, the AOA processor 28 may include and/or may be connected to sensor circuitry that may include an analog to digital converter, a filter, other signal conditioning circuitry, and/or the like to determine angle of attack (AOA) and/or rate of change of the angle of attack (AOA). In one aspect, the angular position sensor 10 may include and/or may be connected to sensor circuitry that may include an analog to digital converter, a filter, other signal conditioning circuitry, and/or the like and transmit a signal indicative of the angle of attack (AOA) and/or rate of change of the angle of attack (AOA) to the AOA processor 28. In some aspects, the AOA processor 28 may be configured on a circuit board, a laminated substrate, a printed circuit board (PCB), a printed wire assembly, a surface that mechanically supports and electrically connects the various electronic components or electrical components, and/or the like within the aircraft airflow sensor probe 100. In one aspect, the AOA processor 28 may be connected to the angular position sensor 10 as described herein.

The aircraft airflow sensor probe 100 may include one or more accelerometers 90 within the main housing assembly 1. In other aspects, the one or more accelerometers 90 may be located elsewhere in the aircraft and provide sensor output to be input to the aircraft airflow sensor probe 100. The one or more accelerometers 90 may sense aircraft movement such as pitch, pitch rate, pitch rate acceleration, roll position, roll rate, roll rate acceleration, yaw position, yaw rate, yaw rate acceleration, and/or the like. In one aspect, the one or more accelerometers 90 may sense a pitch rate and/or a roll rate of the aircraft.

In one aspect, the one or more accelerometers 90 may include at least two accelerometers. In one aspect, the one or more accelerometers 90 may include and/or may be connected to an analog to digital converter, a filter, other signal conditioning circuitry, and/or the like. In this aspect, a pitch rate and/or a roll rate of the aircraft may be determined based on a difference in acceleration sensed between the two accelerometers 90 and output values associated with a pitch rate and/or a roll rate of the aircraft. In one aspect, the AOA processor 28 may receive the values output from the accelerometers 90 for calculation of aircraft movement as defined herein. In one aspect, the AOA processor 28 may receive the values output from the accelerometers 90 for calculation of a pitch rate and/or a roll rate of the aircraft. In one aspect, the AOA processor 28 may be connected to the one or more accelerometers 90 as described herein. In some aspects, the one or more accelerometers 90 may be configured on and/or connected to a circuit board, a laminated substrate, a printed circuit board (PCB), a printed wire assembly, a surface that mechanically supports and electrically connects the various electronic components or electrical components, and/or the like within the aircraft airflow sensor probe 100.

In one aspect, the one or more accelerometers 90 may include four accelerometers 90. In this aspect, a pitch rate and/or a roll rate of the aircraft may be determined based on a difference in acceleration sensed between two of the four accelerometers 90 and output values associated with a pitch rate and/or a roll rate of the aircraft. In one aspect, the AOA processor 28 may be connected to and/or may receive the values output from the accelerometers 90 for calculation of aircraft movement as defined herein. In one aspect, the AOA processor 28 may receive the values output from the accelerometers 90 for calculation of a pitch rate and/or a roll rate of the aircraft.

In one aspect, based on the aircraft movement, which may include an estimate of aerodynamic force on the vane assembly 53, a correction factor may be generated. In one aspect, the correction factor may be generated based on a pitch rate and/or a roll rate of the aircraft. In this regard, aspects of the aircraft movement may be provided by the aircraft and may include the pitch rate and/or the roll rate of the aircraft. In one aspect, the AOA processor 28 may calculate the correction factor. In particular, the AOA processor 28 may calculate the correction factor based on the aircraft movement provided by the aircraft and may include the pitch rate and/or the roll rate of the aircraft as well as based on the effects at the sensor location that are known in advance for a reasonable range of rates. In one aspect, another processor may calculate the correction factor. The correction factor may then be applied to the measured angle of attack (AOA) measured by the angular position sensor 10 responsive to the vane assembly 53 of the aircraft airflow sensor probe 100. In this regard, the correction factor may be a function of a pitch rate and/or a roll rate of the aircraft. The pitch rate and/or the roll rate of the aircraft may be applied to a calibration table, algorithm, lookup table and/or the like by the AOA processor 28 or another processor that generates the correction factor that may be added/subtracted from the angle of attack (AOA) measurement from the vane assembly 53. In one aspect, the correction factor is generated by the AOA processor 28.

In further aspects, the aircraft airflow sensor probe 100 may also sense airspeed. In one aspect, a correction factor may be generated based on the aircraft movement and/or airspeed, which may include an estimate of aerodynamic force on the vane assembly 53. In one aspect, a correction factor may be generated based on the aircraft movement and airspeed. In one aspect, based on a pitch rate and/or a roll rate of the aircraft and an airspeed, a correction factor may be generated. In one aspect, the correction factor may be generated by the AOA processor 28. In one aspect, the correction factor may be generated by another processor. The correction factor may then be applied to a measured angle of attack (AOA) measured by the angular position sensor 10 responsive to the vane assembly 53 of the aircraft airflow sensor probe 100. In this regard, the correction factor may be a function of a pitch rate and/or a roll rate of the aircraft as well as the airspeed. The aircraft movement information, the pitch rate and/or the roll rate of the aircraft as well as the airspeed may be applied to a calibration table, algorithm, lookup table and/or the like implemented by the AOA processor 28 or another processor that generates the correction factor that may be added/subtracted from the measured angle of attack (AOA) measurement from the angular position sensor 10 responsive to the vane assembly 53.

In further aspects, an airspeed correction factor may also be applied to a measured airspeed measured by the aircraft airflow sensor probe 100. In this regard, aircraft movement, such as a pitch rate and/or a roll rate of the aircraft may affect the accuracy of airspeed measurements. The correction factor may be a function of an aircraft movement, such as pitch rate and/or a roll rate of the aircraft. The aircraft movement information, such as the pitch rate and/or the roll rate of the aircraft may be applied to a calibration table, algorithm, lookup table and/or the like implemented by the AOA processor 28 or another processor that generates the airspeed correction factor that may be added/subtracted from the measured airspeed by the aircraft airflow sensor probe 100.

Figure 4:
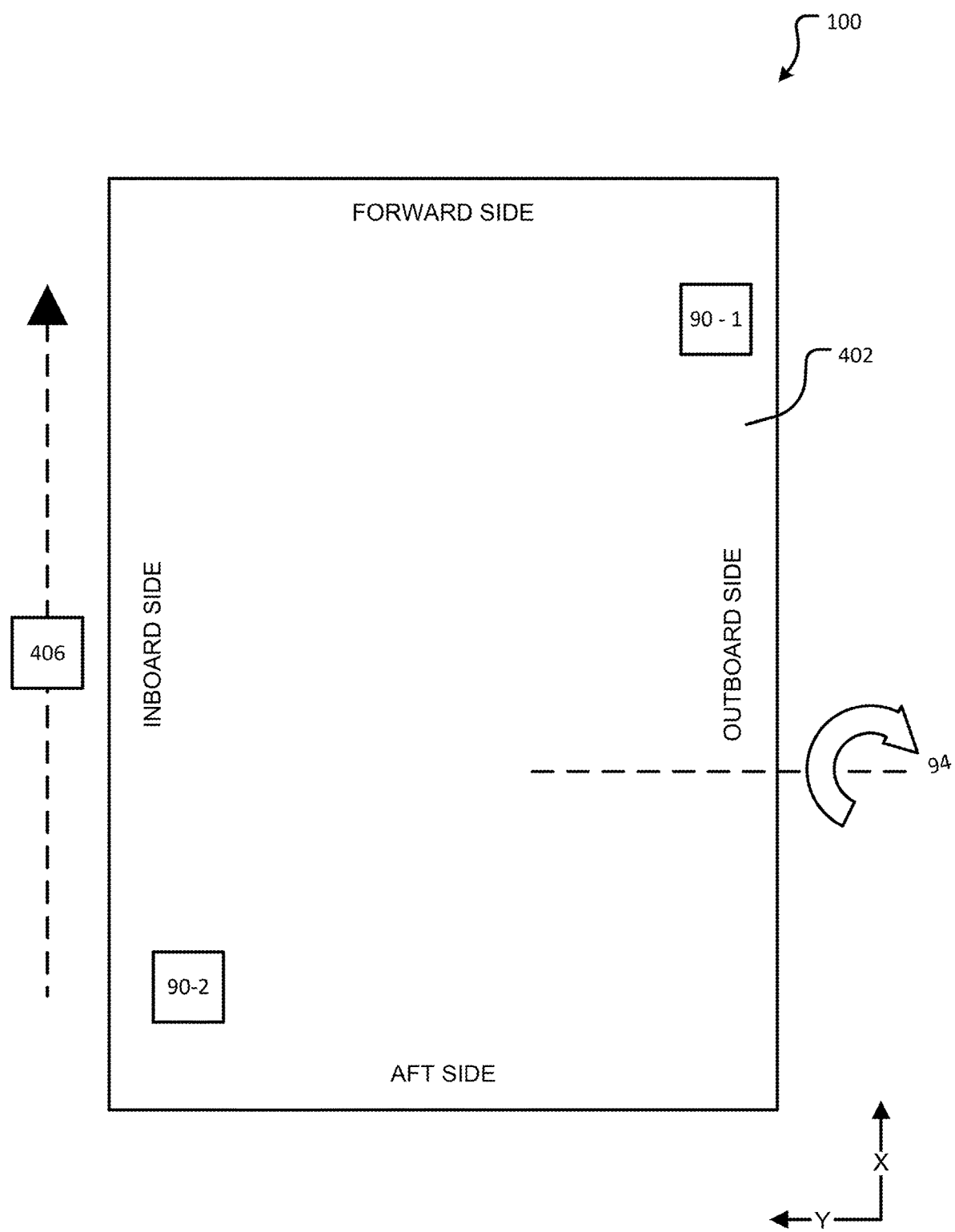
FIG. 4 illustrates an accelerometer layout of the aircraft airflow sensor probe according to the disclosure.

FIG. 4 illustrates an accelerometer layout of the aircraft airflow sensor probe according to the disclosure.

In particular, FIG. 4 illustrates an exemplary layout of the one or more accelerometers 90. In this regard, the one or more accelerometers 90 may be arranged on and/or connected to a board 402 such as a circuit board, a laminated substrate, a printed circuit board (PCB), a printed wire assembly, a surface that mechanically supports and electrically connects the various electronic components or electrical components, and/or the like.

In one aspect, the board 402 may be arranged in the aircraft airflow sensor probe 100. In one aspect, the board 402 may be arranged in the aircraft separate from the aircraft airflow sensor probe 100. In one aspect, a surface of the board 402 may be vertical and parallel to a line of flight of the aircraft 406, and/or the like. As further shown in FIG. 4, the board 402 may have a forward side that may be closest to the forward end of the aircraft, and an aft side that may be closest to the rear of the aircraft. In one aspect, the board 402 may be arranged on an outboard side that is closest to the outside surface of the aircraft; and the board 402 may have an inboard side that is closest to the centerline of the aircraft. This arrangement may be for the aircraft airflow sensor probe 100 arranged on the right (starboard) side of the aircraft. A similar reversed arrangement may be implemented for the aircraft airflow sensor probe 100 arranged on the left (port) side of the aircraft.

In the configuration of the board 402 in FIG. 4, a first one of the accelerometers 90 (90-1) may be arranged in a forward side/outboard side location on one of the board 402; and a second one of the accelerometers 90 (90-2) may be arranged in an aft side/inboard side location of the boards 404. In particular aspects, separating the accelerometers 90 as much as possible may improve acceleration sensing accuracy. Other arrangements of the board 402 and the accelerometers 90 is contemplated as well. For example, the board 402 may be implemented with three of the accelerometers 90. As further illustrated in FIG. 4, the vane assembly 53 may rotate to remain continuously aligned with the local airstream during most flight operations as illustrated by the dashed line and arrow 94 shown in FIG. 4. Accordingly, the AOA vane axis is parallel along the Y axis to a line through the accelerometers 90 and/or the AOA vane axis is perpendicular along the X axis to a line through the accelerometers 90.

Figure 5:
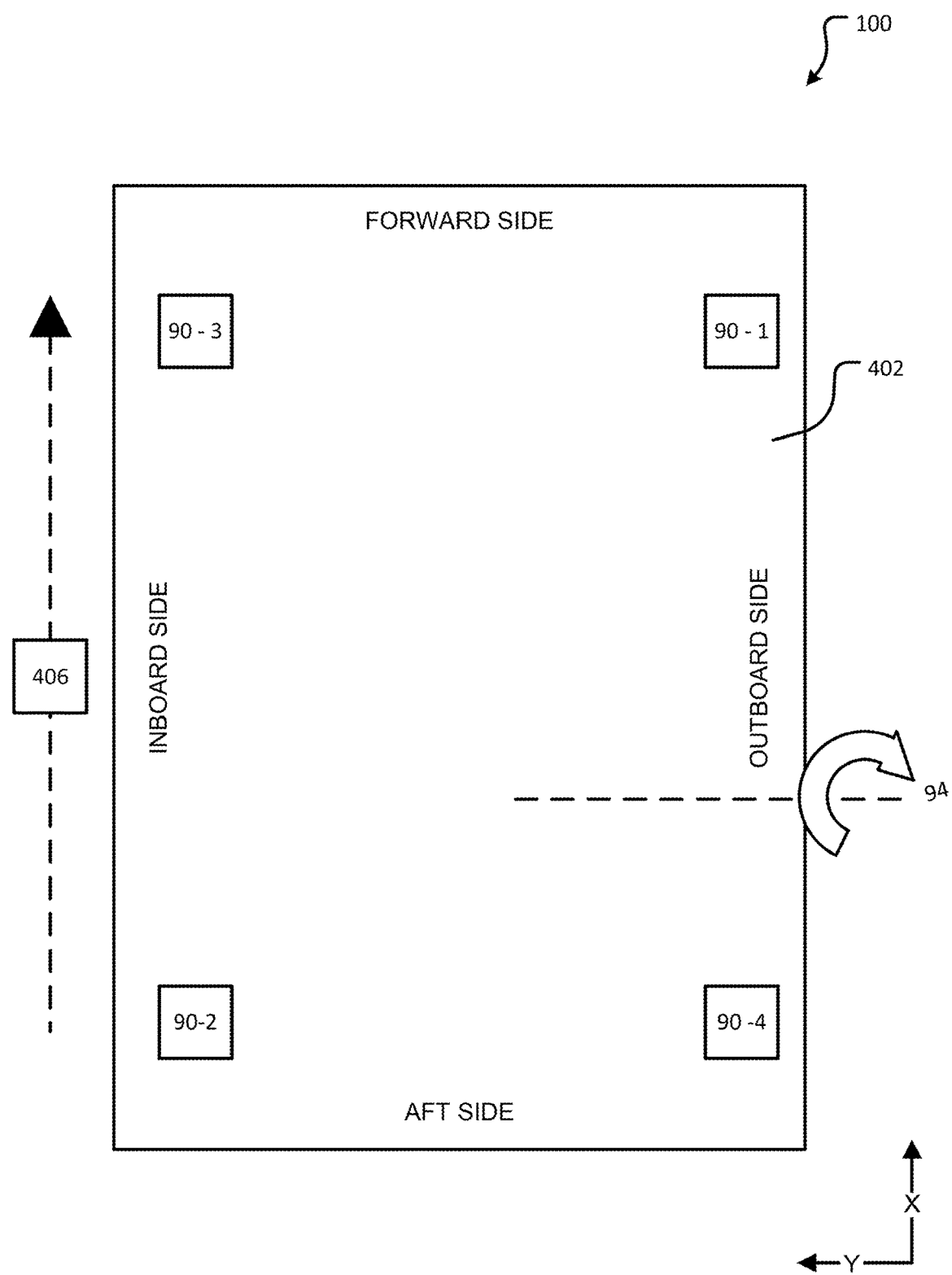
FIG. 5 illustrates an alternative accelerometer layout of the aircraft airflow sensor probe according to the disclosure.

FIG. 5 illustrates an alternative accelerometer layout of the aircraft airflow sensor probe according to the disclosure.

In the configuration of the board 402 in FIG. 5, a first one of the accelerometers 90 (90-1) may be arranged in a forward side/outboard side location on the board 402; a second one of the accelerometers 90 (90-2) may be arranged in an aft side/inboard side location of the board 402; a third one of the accelerometers 90 (90-3) may be arranged in a forward side/inboard side location of the board 402; and a fourth one of the accelerometers 90 (90-4) may be arranged in an aft side/outboard side location of the board 402. In particular aspects, separating accelerometers 90 as much as possible may improve acceleration sensing accuracy. Other arrangements of the board 402 and the accelerometers 90 is contemplated as well. As further illustrated in FIG. 5, the vane assembly 53 may rotate to remain continuously aligned with the local airstream during most flight operations as illustrated by the dashed line and arrow 94 shown in FIG. 5. Accordingly, the AOA vane axis is parallel along the Y axis to a line through the accelerometers 90 and/or the AOA vane axis is perpendicular along the X axis to a line through the accelerometers 90.

Figure 6:
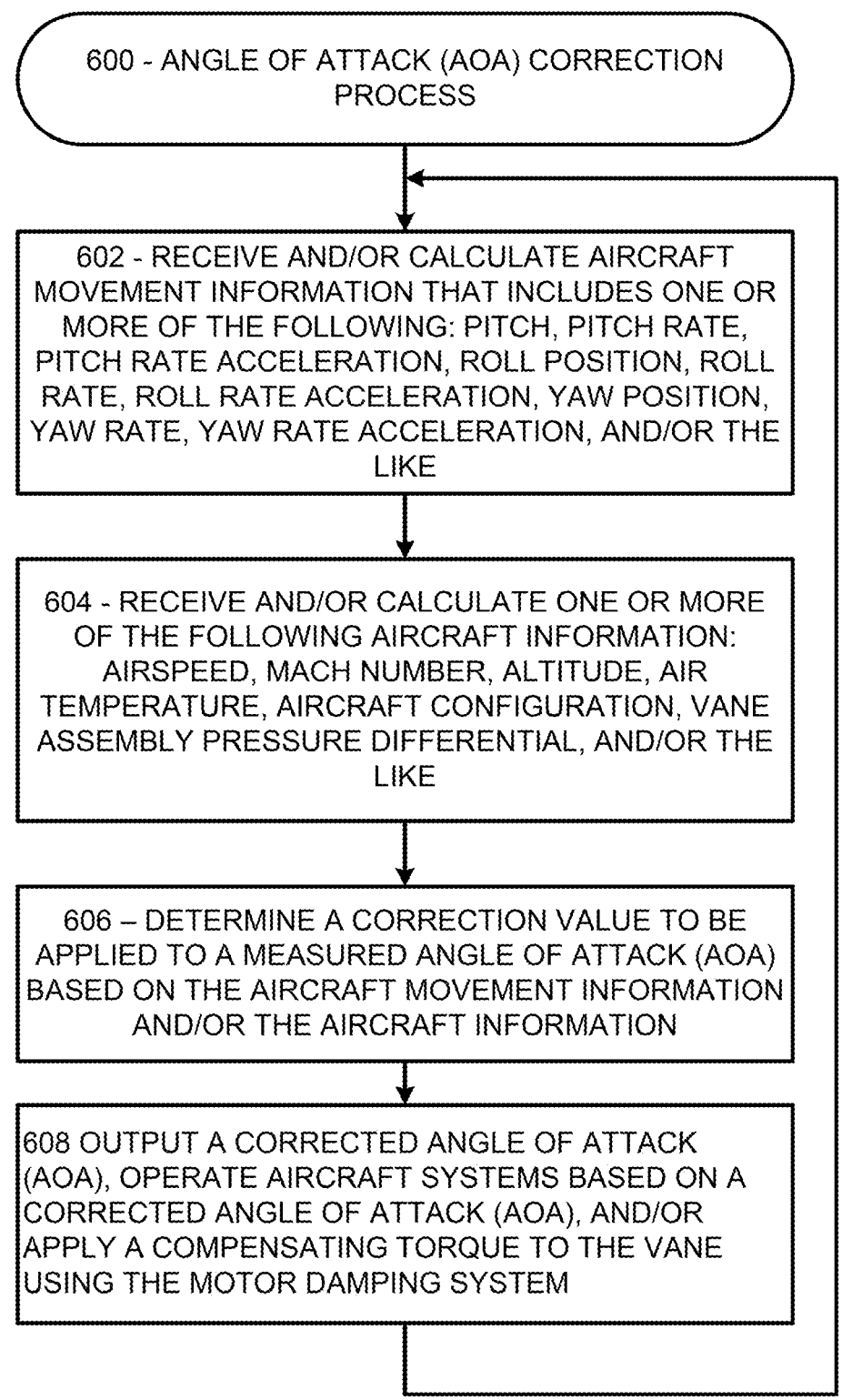
FIG. 6 illustrates an operational process implemented by the aircraft airflow sensor probe according to FIG. 1.

FIG. 6 illustrates an operational process implemented by the aircraft airflow sensor probe according to FIG. 1.

In particular, FIG. 6 illustrates an angle of attack (AOA) correction process 600. In one aspect, the angle of attack (AOA) correction process 600 may be executed by the AOA processor 28. In one aspect, the angle of attack (AOA) correction process 600 may be executed by the AOA processor 28 and another processor. In one aspect, the angle of attack (AOA) correction process 600 may be executed by another processor. In particular, it should be noted that the angle of attack (AOA) correction process 600 is merely exemplary and may be modified consistent with the various aspects disclosed herein. Moreover, the angle of attack (AOA) correction process 600 may be performed in a different order consistent with the aspects described above. Moreover, the angle of attack (AOA) correction process 600 may be modified to have more or fewer process steps consistent with the various aspects disclosed herein.

In box 602, the aircraft airflow sensor probe 100 may receive and/or calculate aircraft movement information. The aircraft movement information may be received and/or calculated from sensor readings from the one or more accelerometers 90. The aircraft movement information may include pitch, pitch rate, pitch rate acceleration, roll position, roll rate, roll rate acceleration, yaw position, yaw rate, yaw rate acceleration, and/or the like. In one aspect, the aircraft movement information may include pitch rate, roll rate, and/or the like. In one aspect, the aircraft movement information may include pitch rate and/or roll rate. In one aspect, the aircraft movement information may include pitch rate and roll rate.

In box 604, the aircraft airflow sensor probe 100 may receive and/or calculate one or more of the following aircraft information: airspeed, Mach number, altitude, air temperature, aircraft configuration, vane assembly pressure differential, angle of attack (AOA), rate of change of the angle of attack (AOA), and/or the like.

In this regard, the airspeed, Mach number, altitude, and vane assembly pressure differential aircraft information may be obtained from the air pressure sensors 80 associated with the air pressure ports 68, the air pressure ports 70, and the air pressure ports 72 as described below. Additionally, the outputs of the air pressure sensors 80 may be processed in the AOA processor 28 to generate the airspeed, Mach number, altitude, and/or vane assembly pressure differential aircraft information. Alternatively, the airspeed, Mach number, and other information may be received by the aircraft airflow sensor probe 100 through electrical interfaces from the aircraft as described below.

The air temperature may be obtained from an air temperature sensor located on the aircraft airflow sensor probe 100, connected to the aircraft airflow sensor probe 100, and/or a temperature sensor located on the aircraft and received by the aircraft airflow sensor probe 100 through electrical interfaces as described below. The air temperature sensor may be implemented as a thermistor, thermocouple, resistance thermometer, silicon bandgap temperature sensor, and/or the like.

The angle of attack (AOA) may be obtained from the angular position sensor 10 of the aircraft airflow sensor probe 100 and calculated with the AOA processor 28. The rate of change of the angle of attack (AOA) may also be obtained from the angular position sensor 10 of the aircraft airflow sensor probe 100 and calculated with the AOA processor 28.

The aircraft configuration may be received by the aircraft airflow sensor probe 100 through the electrical interfaces described below. The aircraft configuration information may include a state of the flaps, speed brakes, weight on wheels, landing gear down/locked, and/or the like.

In box 606, the aircraft airflow sensor probe 100 and/or the AOA processor 28 may determine a correction value to be applied to the measured angle of attack (AOA) sensed by the vane assembly 53 based on the aircraft movement information and/or the aircraft information.

In box 608, the aircraft airflow sensor probe 100 and/or the AOA processor 28 may output a corrected angle of attack (AOA) based on the correction value applied to the angle of attack (AOA) sensed by the vane assembly 53 based on the aircraft movement information and/or the aircraft information.

In one aspect, the AOA processor 28 may correct the measured angle of attack (AOA) provided by the vane assembly 53 to ensure a more accurate angle of attack determination. In particular, the AOA processor 28 may apply a compensating torque to the vane assembly 53 using the motor 6 implementing a damping system as described herein.

Figure 7:
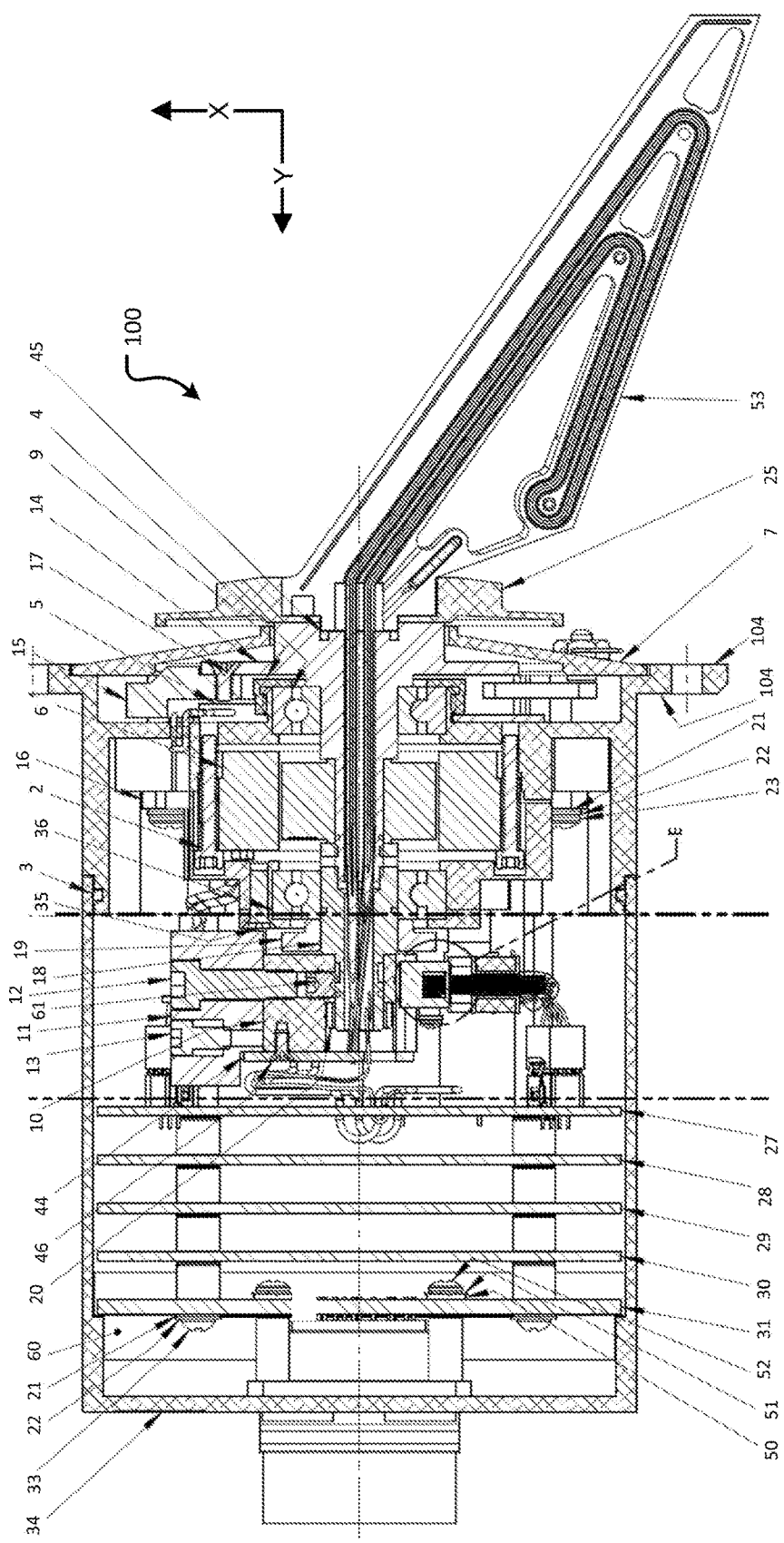
FIG. 7 illustrates a cross-sectional view of the aircraft airflow sensor probe according to FIG. 1.
Figure 9:
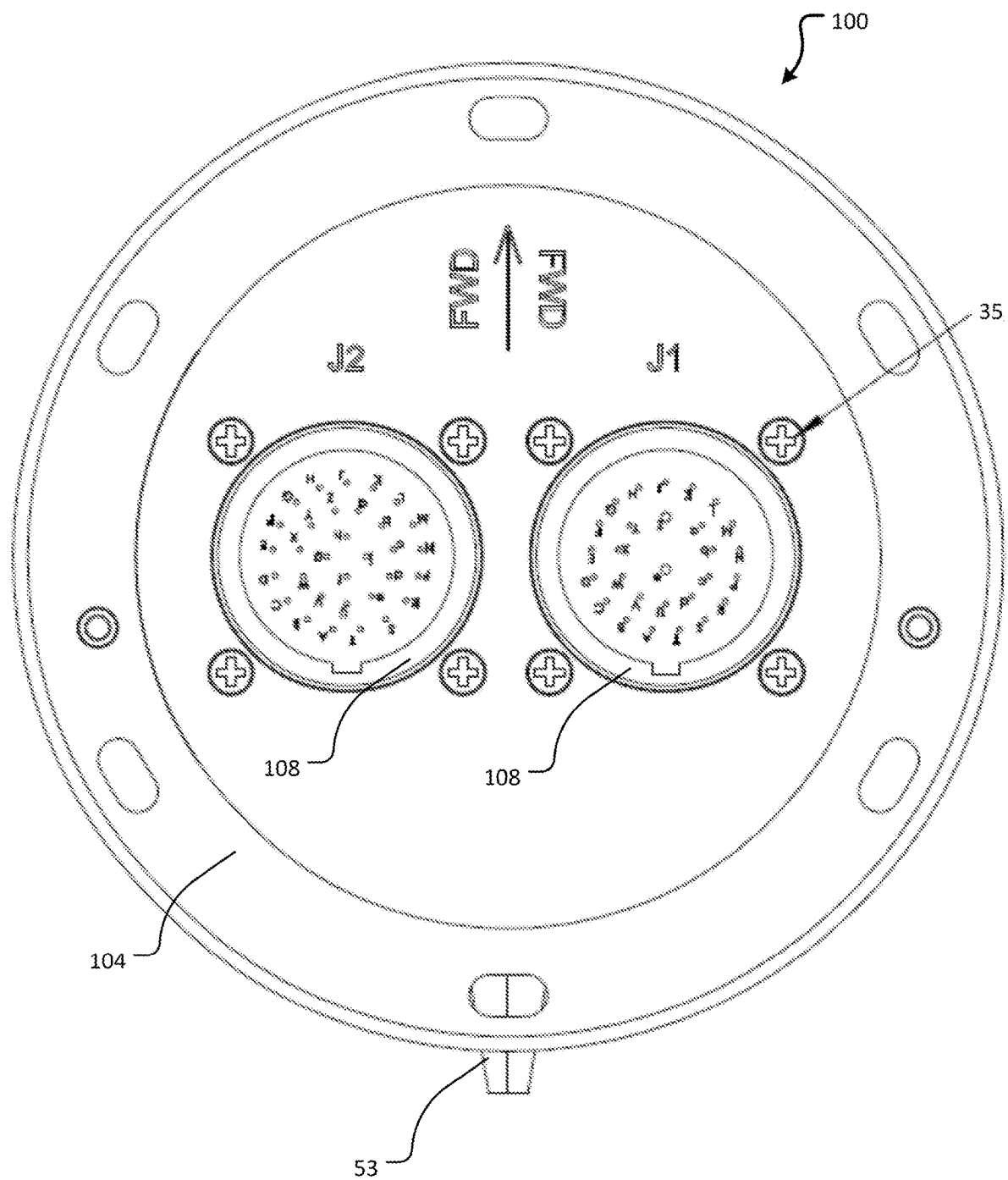
FIG. 9 illustrates a backside view of the aircraft airflow sensor probe according to FIG. 1.
Figure 10:
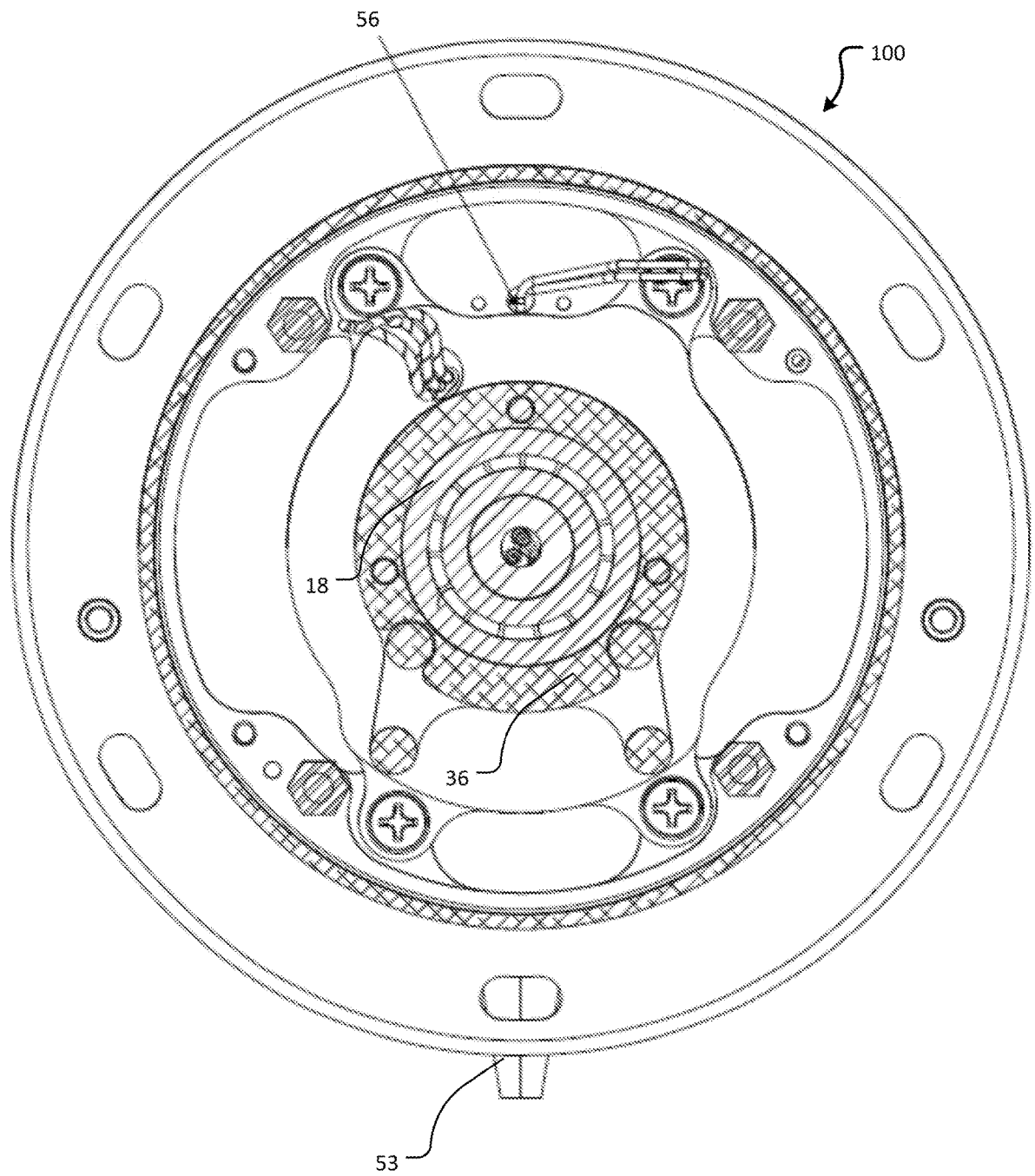
FIG. 10 illustrates another cross-sectional view of the aircraft airflow sensor probe according to FIG. 1.
Figure 11:
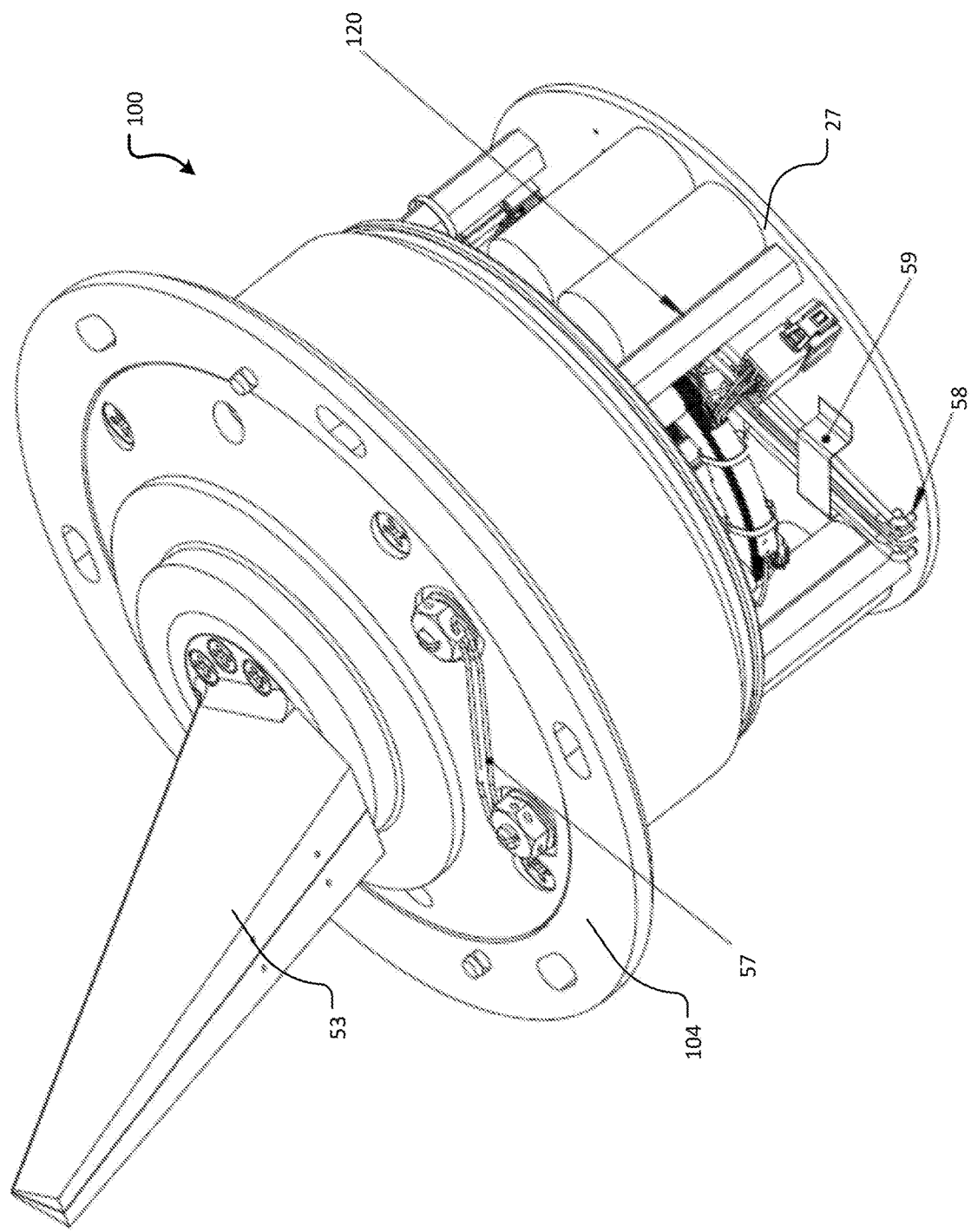
FIG. 11 illustrates a partial front side perspective view of the aircraft airflow sensor probe according to FIG. 1.
Figure 12:
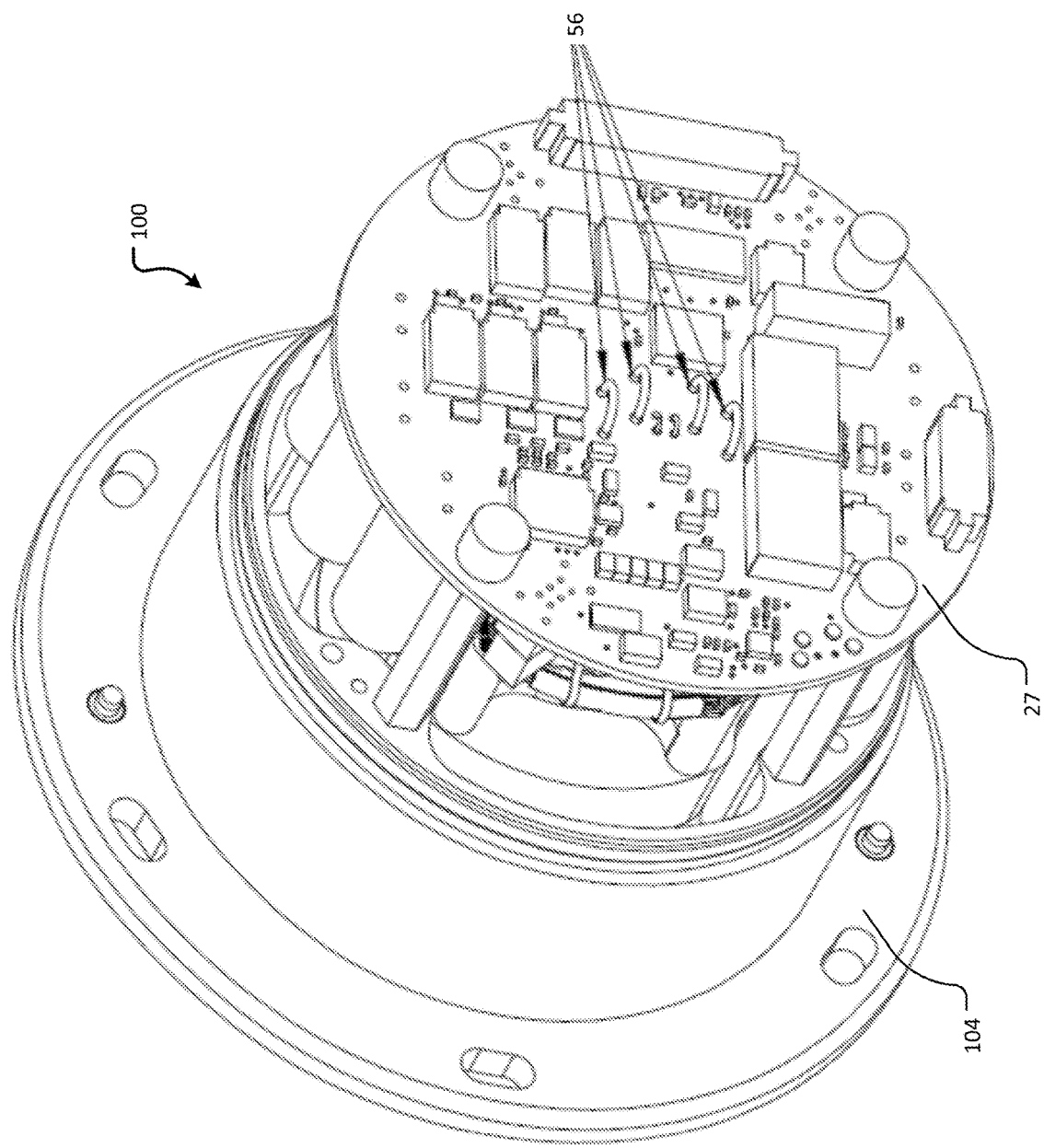
FIG. 12 illustrates a partial backside perspective view of the aircraft airflow sensor probe according to FIG. 1.
Figure 13:
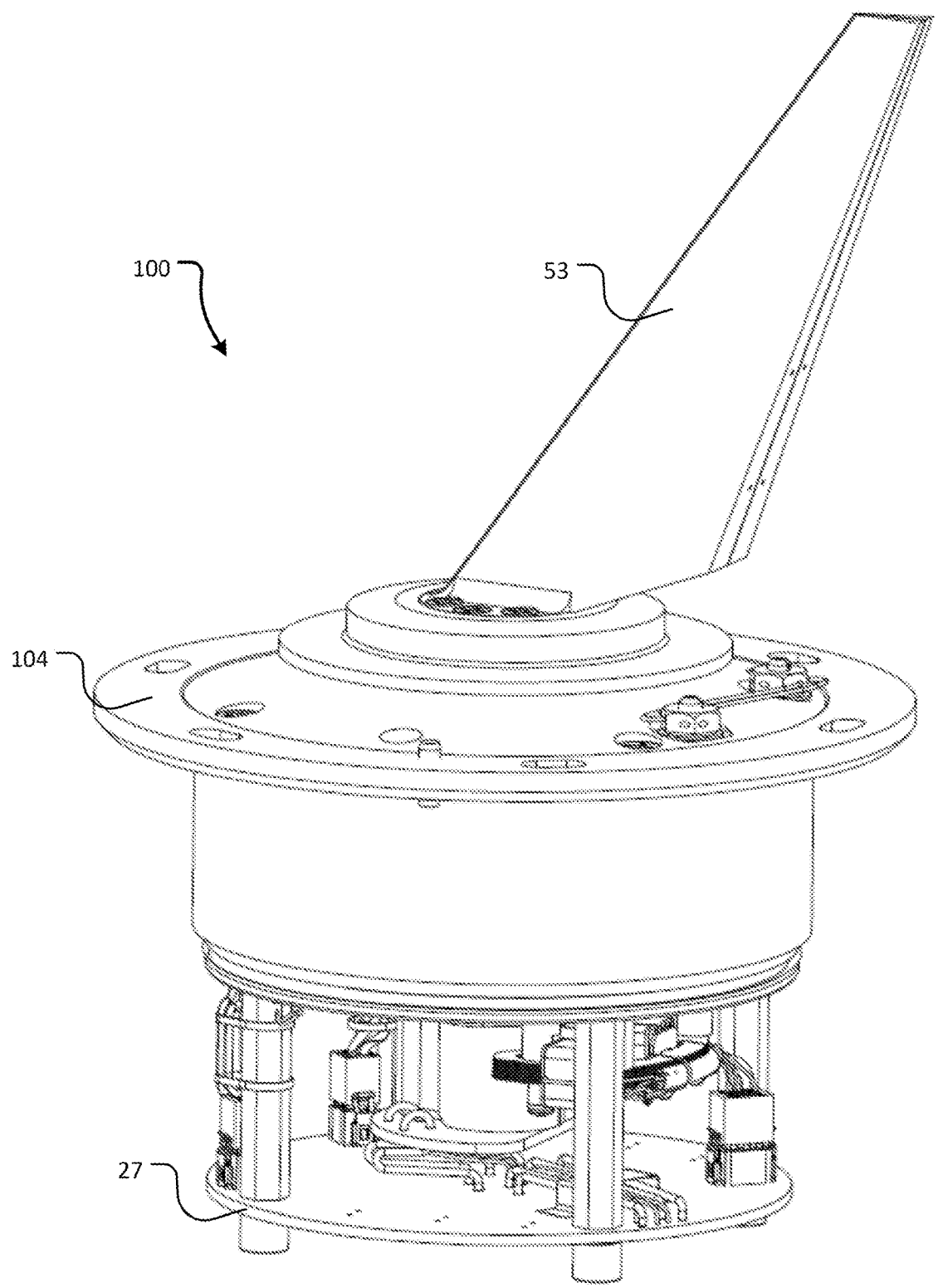
FIG. 13 illustrates a partial perspective side view of the aircraft airflow sensor probe according to FIG. 1.
Figure 14:
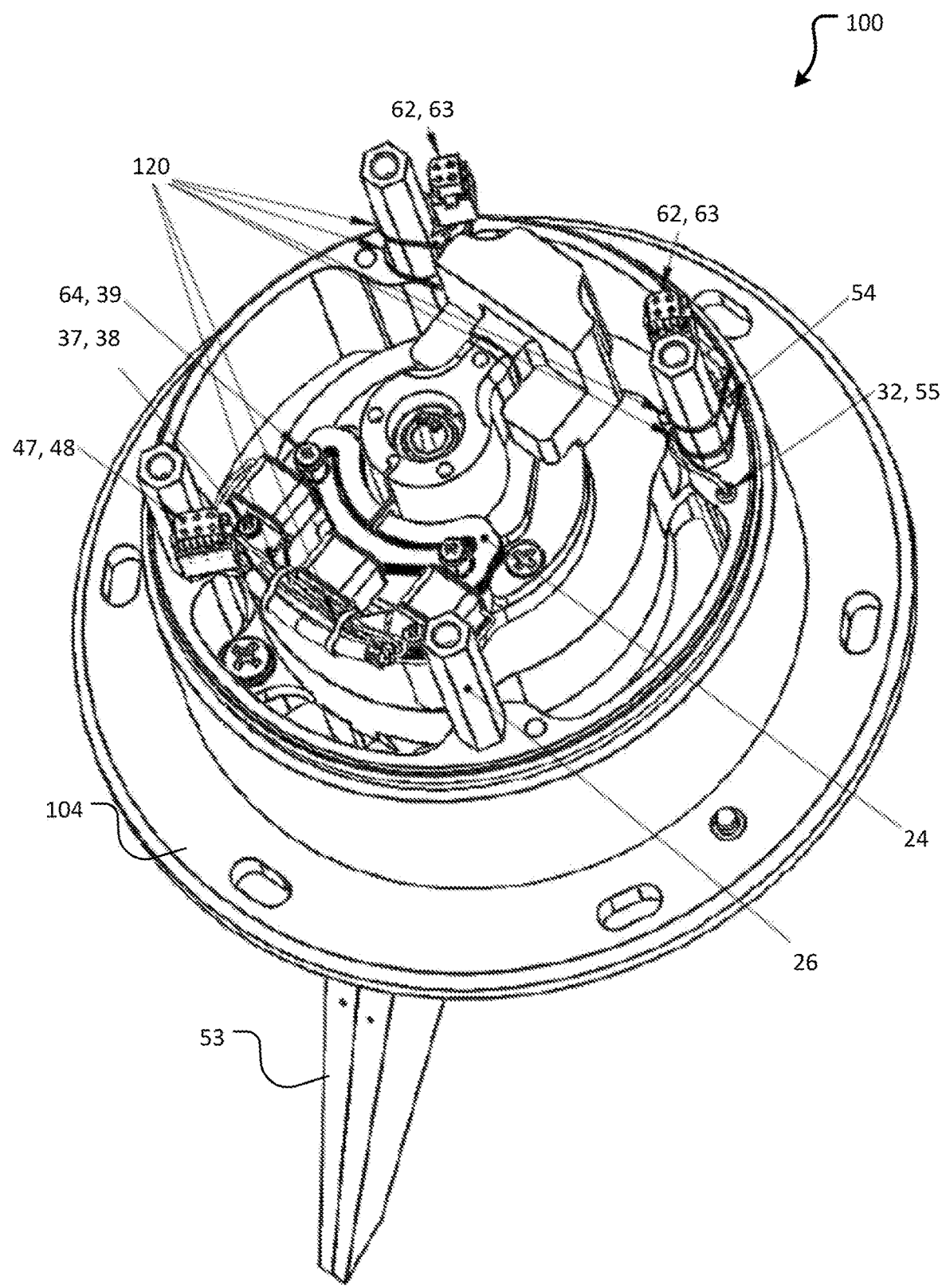
FIG. 14 illustrates another partial backside perspective view of the aircraft airflow sensor probe according to FIG. 1.

FIG. 7 illustrates a cross-sectional view of the aircraft airflow sensor probe according to FIG. 1; FIG. 8 illustrates a front view of the aircraft airflow sensor probe according to FIG. 1; FIG. 9 illustrates a backside view of the aircraft airflow sensor probe according to FIG. 1; FIG. 10 illustrates another cross-sectional view of the aircraft airflow sensor probe according to FIG. 1; FIG. 11 illustrates a partial front side perspective view of the aircraft airflow sensor probe according to FIG. 1; FIG. 12 illustrates a partial backside perspective view of the aircraft airflow sensor probe according to FIG. 1; FIG. 13 illustrates a partial perspective side view of the aircraft airflow sensor probe according to FIG. 1; and FIG. 14 illustrates another partial backside perspective view of the aircraft airflow sensor probe according to FIG. 1.

With reference to FIG. 7, the aircraft airflow sensor probe 100 may include the main housing assembly 1 that supports the vane assembly 53. More specifically, the vane assembly 53 may be supported by one or more shafts in order to rotate and sense the airflow past the vane assembly 53. In one aspect, the shaft may include a shaft 14 and a shaft 18. The shaft 14 and/or the shaft 18 may be supported within the main housing assembly 1 with bearings. In one aspect, the bearings may include a bearing 4 and a bearing 36.

In particular alternative aspects, the shaft 14 and/or shaft 18 may be connected to a motor 6. The motor 6 may include and/or may be connected to a motor controller 27. In some aspects, the motor controller 27 may be configured on and/or connected to a circuit board, a laminated substrate, a printed circuit board (PCB), a printed wire assembly, a surface that mechanically supports and electrically connects the various electronic components or electrical components, and/or the like within the aircraft airflow sensor probe 100. Details of the motor 6 and associated implementations are described in U.S. patent application Ser. No. 16/270,200 filed Feb. 7, 2019 and incorporated herein by reference in its entirety.

Figure 15:
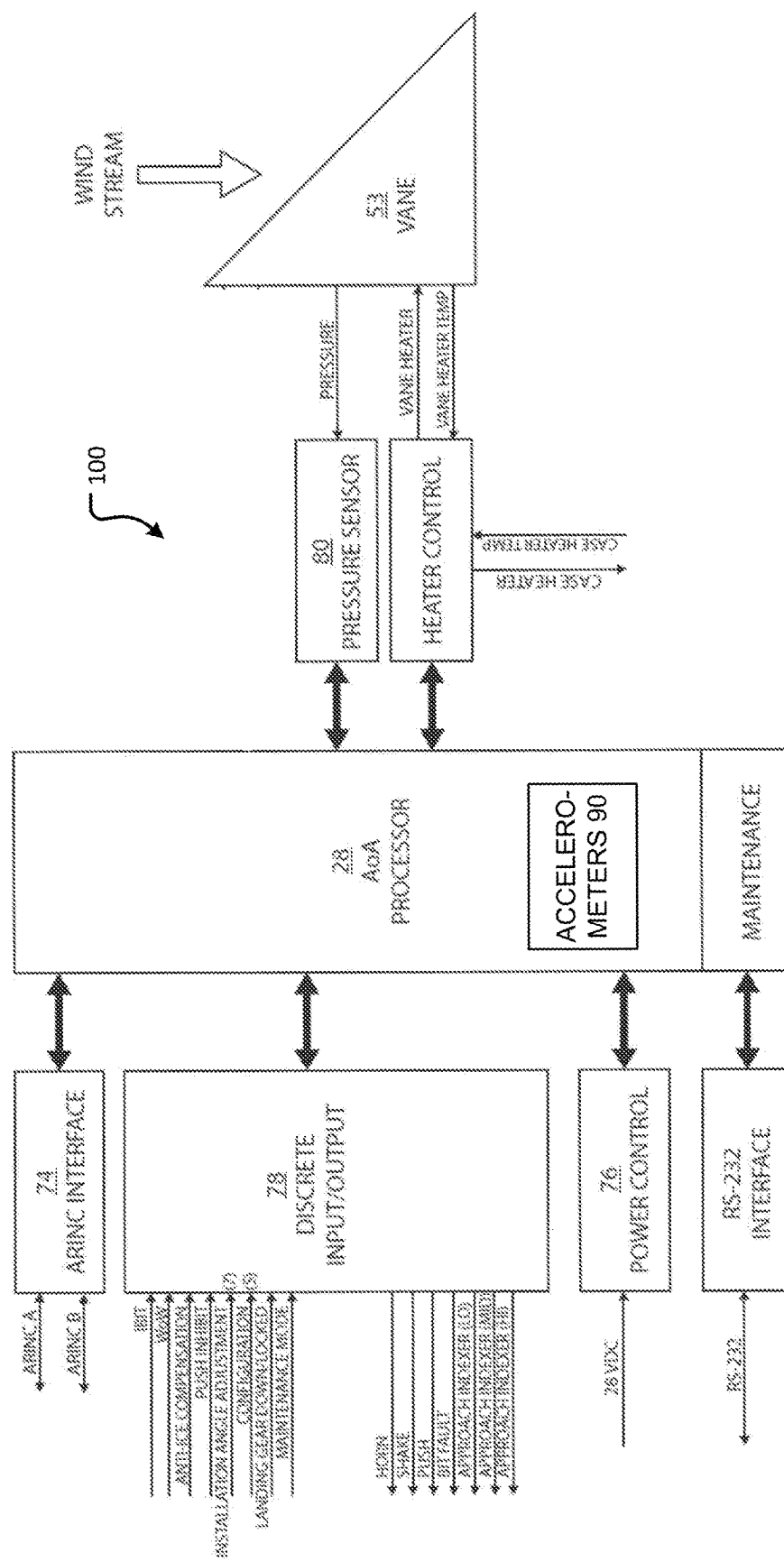
FIG. 15 illustrates a schematic of the aircraft airflow sensor probe according to FIG. 1.

FIG. 15 illustrates a schematic of the aircraft airflow sensor probe according to FIG. 1.

The aircraft airflow sensor probe 100 may further include and/or may be connected to a number of air pressure sensors 80. The air pressure sensors 80 may include or may be connected to one or more air pressure ports configured to receive air pressure exerted on the aircraft airflow sensor probe 100 and/or the vane assembly 53. The air pressure ports may be located on the aircraft airflow sensor probe 100 and/or the vane assembly 53 and receive air and direct the air to the air pressure sensor 80 that senses the air pressure received by the air pressure ports. The air pressure sensor 80 may use a force collector (such a diaphragm, piston, bourdon tube, bellows, and/or the like) to measure strain (or deflection) due to an applied force over an area (pressure). The air pressure sensor 80 may be implemented as a strain gauge, piezoresistive strain gauge, a capacitive sensor, an electromagnetic sensor, a piezoelectric sensor, an optical sensor, a potentiometric sensor, and/or the like. The air pressure sensor 80 and/or sensor circuitry may include and/or may be connected to an analog to digital converter, a filter, other signal conditioning circuitry, and/or the like and transmit a signal indicative of the air pressure received at a particular air pressure port to the AOA processor 28.

Figure 8:
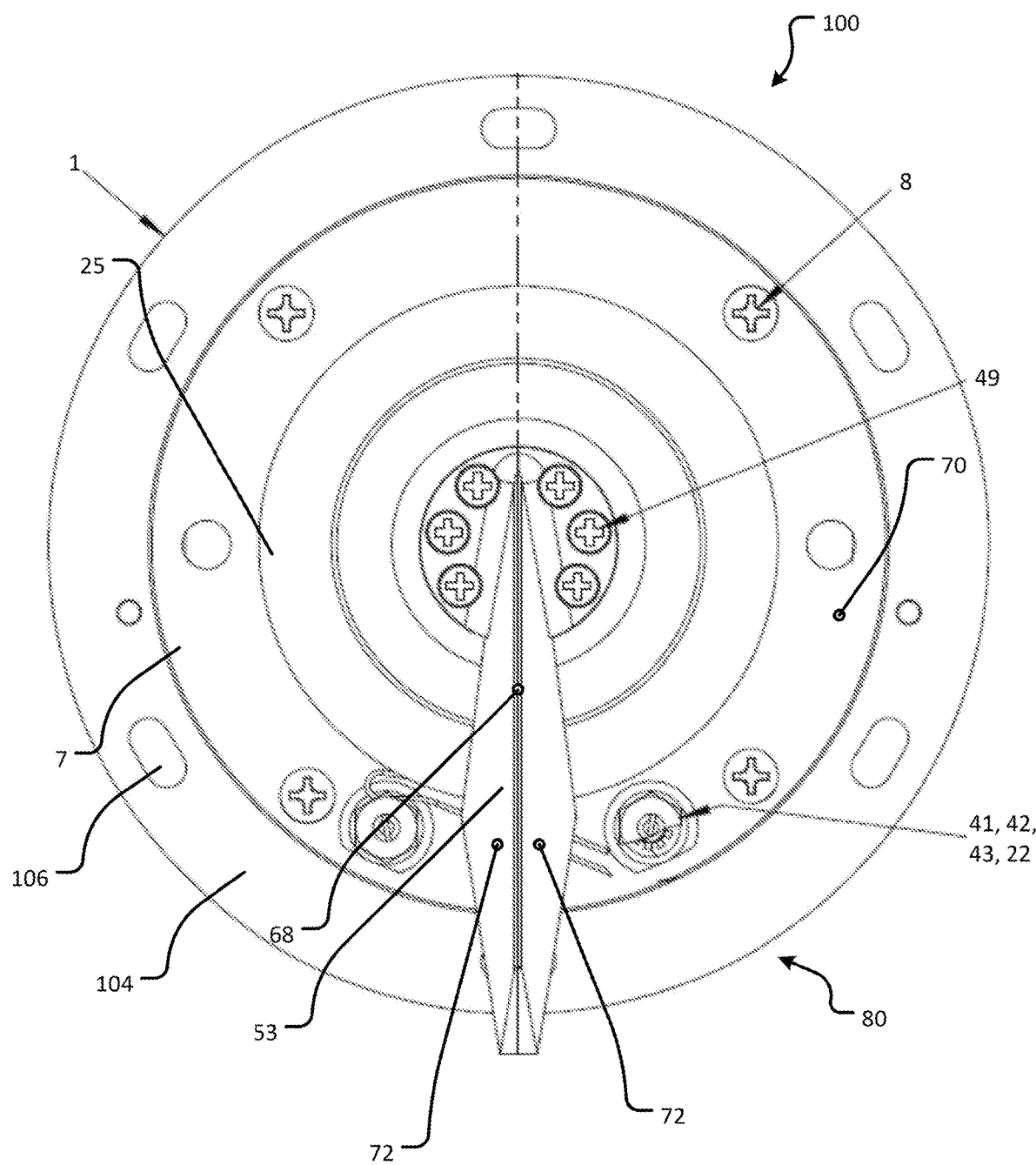
FIG. 8 illustrates a front view of the aircraft airflow sensor probe according to FIG. 1.

In one aspect in reference to FIG. 8, an air pressure port 68 may be located on a leading edge of the vane assembly 53 in order to receive an air pressure indicative of an airflow velocity or aircraft airspeed impacting the vane assembly 53. The air pressure sensor 80 may be configured to measure the dynamic pressure in order to obtain an airspeed, Mach number, and/or the like. In one aspect, the AOA processor 28 may be configured to calculate airspeed, Mach number, and/or the like in response to signals from the air pressure sensor 80. In one aspect, the AOA processor 28 may be configured to receive and/or calculate airspeed, Mach number, and/or the like in response to signals from the aircraft.

In one aspect, air pressure ports 72 may be located on both a top surface and bottom surface of the vane assembly 53 in order to receive an air pressure for these respective surfaces. In this aspect, there may be air pressure sensors 80 associated with each air pressure port 72 in order to determine a pressure differential between the top surface and bottom surface of the vane assembly 53. In one aspect, the AOA processor 28 may be configured to calculate the pressure differential in response to signals from the air pressure sensors 80.

In one aspect, an air pressure port 70 may be located on the aircraft airflow sensor probe 100 in order to receive a static air pressure. The static air pressure may be utilized to determine an altitude, altitude trend, and/or the like. In one aspect, the AOA processor 28 may be configured to calculate an altitude, altitude trend, and/or the like in response to signals from the air pressure sensor 80. In one aspect, the AOA processor 28 may be configured to receive and/or calculate an altitude, altitude trend, and/or the like in response to signals from the aircraft.

In one aspect, there may be a plurality of air pressure ports and a plurality of air pressure sensors 80 in order to measure the airflow velocity or aircraft airspeed, the static air pressure, and the pressure differential as described above.

Referring back to FIG. 15, the aircraft airflow sensor probe 100 may include hardware that may be responsible for all environmental protection, any power conditioning, and conversion, raw signal sensing, relay of signal data, and/or the like. The aircraft airflow sensor probe 100 may include software implemented by a processor such as the AOA processor 28 that may be responsible for data monitoring, data conversion, calculations, operational modes, coordinating/configuring hardware to sense, send, or receive data, and/or the like.

The aircraft airflow sensor probe 100 may include a hardware configuration that may include the AOA processor 28 implemented as a Digital Signal Controller microcontroller (MCU). The MCU may perform all necessary data calculations for the aircraft airflow sensor probe 100. Communication to external aircraft systems may be accomplished via Aeronautical Radio, Incorporated (ARINC) 429 communication buses, discrete signals, and/or the like. However, it should be noted that any type of data bus may be utilized including ARINC, MIL-STD-1553 (military standard), Controller Area Network (CAN), and/or the like.

The AOA processor 28 may contain an operational flight program (OFP) and control the system electronics, heaters, stall warning processes, and/or the like. The AOA processor 28 may receive input from the ARINC 429 communications, discrete inputs, the angular position sensor 10, and/or the like and determine the stall warning conditions, and/or the like. Based on the angle of attack (AOA) calculations, the AOA processor 28 may issue a horn warning, stick shake, stick push, and/or the like.

The aircraft airflow sensor probe 100 may include an ARINC 429 transceiver, an ARINC interface 74, and/or the like. The ARINC 429 transceiver or the ARINC interface 74 may provide ARINC 429 electrical drivers and receivers. The interface with ARINC 429 specification compatible devices may transmit labels as requested by a Stall Warning Transmitter (SWT) application software.

The aircraft airflow sensor probe 100 may include and/or may be connected to a power supply module 76. The power supply module 76 may provide conditioned power to a stall warning computer, angular position transmitter electronics, and other components. In some aspects, the power supply module 76 may be configured on a printed circuit board, on a printed wire assembly, or the like within the aircraft airflow sensor probe 100.

The aircraft airflow sensor probe 100 may include an input/output (I/O) module 78. The input/output (I/O) module 78 may relay signals and may connect to power buses between external aircraft systems and Stall Warning Transmitter (SWT) hardware. The input/output (I/O) module 78 may also provide the circuitry to meet lightning, Electromagnetic Interference (EMI), and high-intensity radiated field (HIRF) requirements.

The vane assembly 53 and system mount may be the only components external to the host aircraft. The vane assembly 53 may include a powered heating element for continuous anti-icing during flight.

The aircraft airflow sensor probe 100 may include numerous other components. In particular, with reference to the Figures and, in particular, FIG. 7, the aircraft airflow sensor probe 100 may include a heater blanket 5 or another heater construction. In this regard, the heater blanket 5 illustrated in FIG. 7 is merely exemplary and may be implemented utilizing any number of heater constructions and/or implementations. With further reference to the Figures and, in particular, FIG. 7, the aircraft airflow sensor probe 100 may include one or more of a fastener 2, a cover seal 3, a fastener 8, a bearing cap 9, a hub counterweight 11, a fastener 12, a fastener 13, a counterweight 15, a motor-bearing support 16, a fastener 17, fastener 19, a rotor clamp fastener 20, a washer 21, a washer 22, a fastener 23, an element assembly 24, a standoff 26, a power supply 29, an interface 30, a connector 31, a thermistor 32, a fastener 33, a fastener 35, a washer 37, a fastener 38, a fastener 39, a fastener 41, a washer 42, a mechanical stop assembly 43, a hub board printed wiring board 44, an O-ring 45, a fastener 46, a female crimp housing 47, a female cable crimp contact 48, a fastener 49, a washer 50, a washer 51, a fastener 52, lacing tape 54, a thermally conductive epoxy 55, an adhesive compound 56, a safety wire or lock 57, wires 58, a shielding tape 59, end portion 60, a set screw 61, a female crimp housing 62, and standoffs 120, a female cable crimp contact 63, a washer 64, and/or the like. These various components are merely exemplary and are not further described, as the details thereof are not necessary for the understanding of disclosure.

The aircraft airflow sensor probe 100 can be mechanically mounted on either the port side, the starboard side, or both sides of the forward fuselage and may electrically connect to several aircraft discretes, power, dual redundant ARINC communication busses, and/or the like through the signal connections 108. However, it should be noted that any type of data bus may be utilized including ARINC, MIL-STD-1553 (military standard), Controller Area Network (CAN), and/or the like. The aircraft airflow sensor probe 100 may also provide a maintenance interface, not connected to the aircraft, allowing for configurations, alignment adjustments, software uploads, and/or the like.

In one aspect, the aircraft airflow sensor probe 100 implemented as a Stall Warning Transmitter (SWT) may provide stall warning and protection by utilizing the vane assembly 53 as an electronically anti-iced vane, external to the host aircraft. The Stall Warning Transmitter (SWT) may calculate a normalized AOA (AOAN), presented as a fraction of the angle of attack interval from zero lift to stall, for a particular configuration of the host aircraft. A distinct aircraft configuration may be determined by the combined state of the flaps, speed brake, anti-ice, and/or the like input parameters to the Stall Warning Transmitter (SWT). From the AOAN, host configuration, and detailed lift curves, the Stall Warning Transmitter (SWT) may calculate stall warning limits such as: Horn, Stick Shake, Stick Push, and/or the like.

If the Horn limit is reached, a horn discrete to the host aircraft may be asserted. If the stick shake limit is reached, a stick shake discrete may be asserted. If the stick push limit is reached, a stick push discrete may be asserted. Each discrete may be asserted until the host aircraft orientation returns to under limit conditions.

In one aspect, the Stall Warning Transmitter (SWT) may be mechanically installed and electrically connected to the aircraft. The Stall Warning Transmitter (SWT) may be interchangeable in that the mechanical alignment and the discretes for configuration and alignment adjustment may be made by the aircraft manufacturer during boresight alignment procedures.

The aircraft airflow sensor probe 100 may include and/or may be connected to electrical interfaces that may include: a dual ARINC interface 74, input discretes from the host aircraft, and output discretes to the host aircraft, operating power, and/or the like.

The Stall Warning Transmitter (SWT) may receive the following communication signals from the host aircraft: flap position, speed brake position, Pilot Activated Test (Initiated Built-In Test (IBIT)), and/or the like. The Stall Warning Transmitter (SWT) may provide the following words/labels to the host aircraft: Normalized Angle of Attack, Local Angle of Attack, Built-In-Test (BIT) Fails, Normalized Angle of Attack Shaker Assertion Angle, and/or the like.

The AOA processor 28 may contain an operational flight program (OFP) that may control system electronics, heaters, stall warning processes, and/or the like. The AOA processor 28 may receive input from the ARINC communications, input discretes, angular position sensor 10 signals, control signals, and/or the like to determine the stall warning conditions. Based on the calculations, the AOA processor 28 may issue a horn warning, stick shake, or stick push.

In one aspect, the aircraft airflow sensor probe 100 may be configured as a single Line-Replaceable Unit (LRU) that may be connected to the aircraft power lines and/or signal lines. The Line-Replaceable Unit (LRU) configuration may be a modular component of the airplane that may be designed to be replaced quickly at an operating location. In this regard, the aircraft airflow sensor probe 100 may be mechanically installed and electrically connected to the aircraft. The aircraft airflow sensor probe 100 may be interchangeable in that the mechanical alignment and the discrete configuration and alignment adjustment are made by the aircraft manufacturer during boresight alignment procedures.

The aircraft airflow sensor probe 100 may have an input discrete for a maintenance mode. The maintenance mode may be used for system verification, to troubleshoot BIT (Built In Test) failures, update the operational flight program (OFP) software, provide a means to upload lift curves, and/or the like.

In accordance with various aspects of the disclosure, a ratio between a change in local airstream direction and the corresponding change in a resultant output may represent a "normalized angle of attack" that is varied as a function of flap position and the resultant output may be biased as a function of flap position so that the resultant output represents a zero "normalized angle of attack" whenever the combination of flap position and local airstream direction is such that the aerodynamic lift is zero and so that the resultant output represents 100 percent of a "normalized angle of attack" whenever the combination of flap position and local airstream direction is such that a further increase in angle of attack would result in stalling of aircraft. The resultant output representing a "normalized angle of attack" may be utilized for indication, control purposes, and/or the like.

Figure 16:
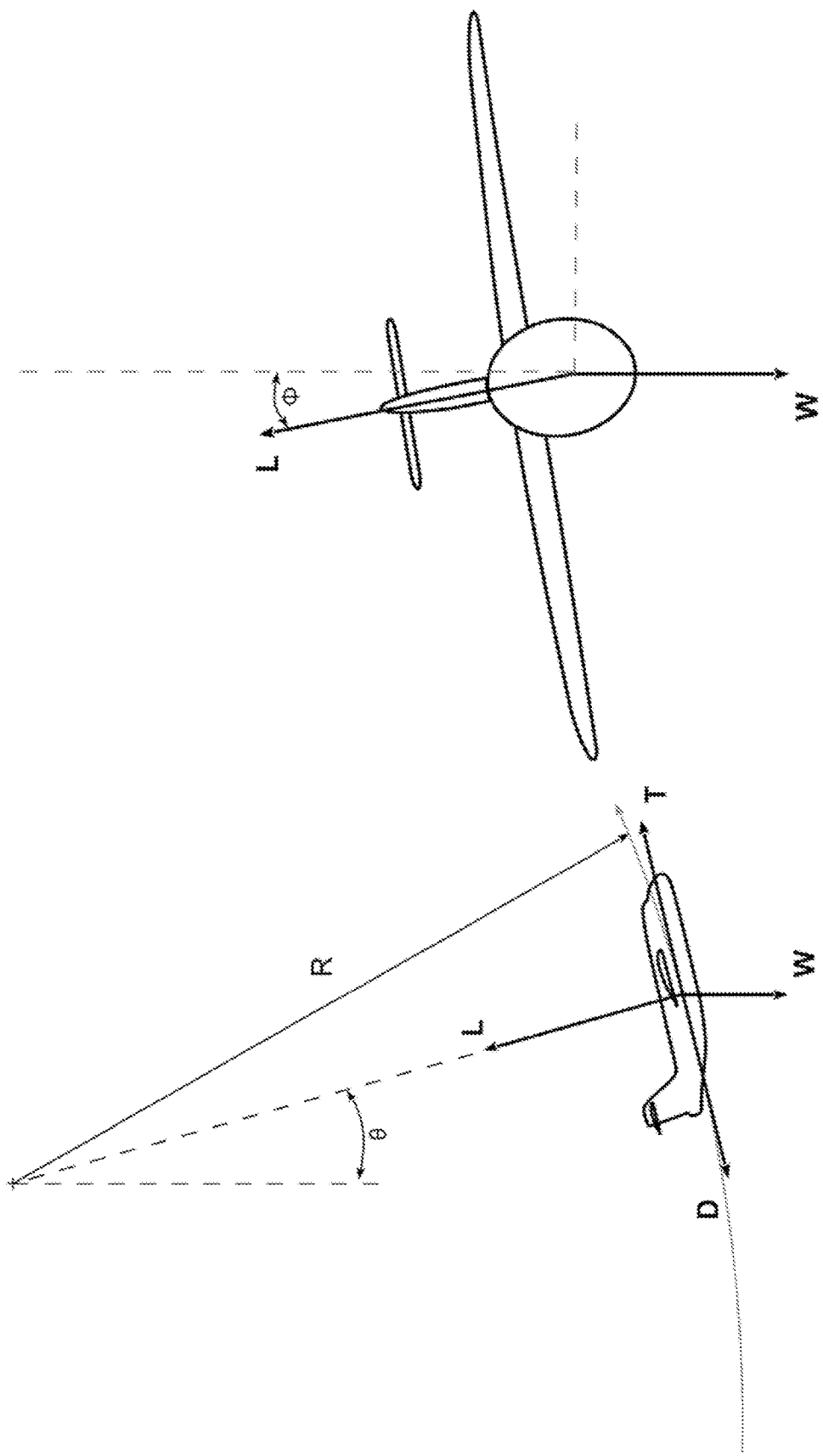
FIG. 16 illustrates a frame of reference for an aircraft conducting pitch and roll maneuvers.
Figure 17:
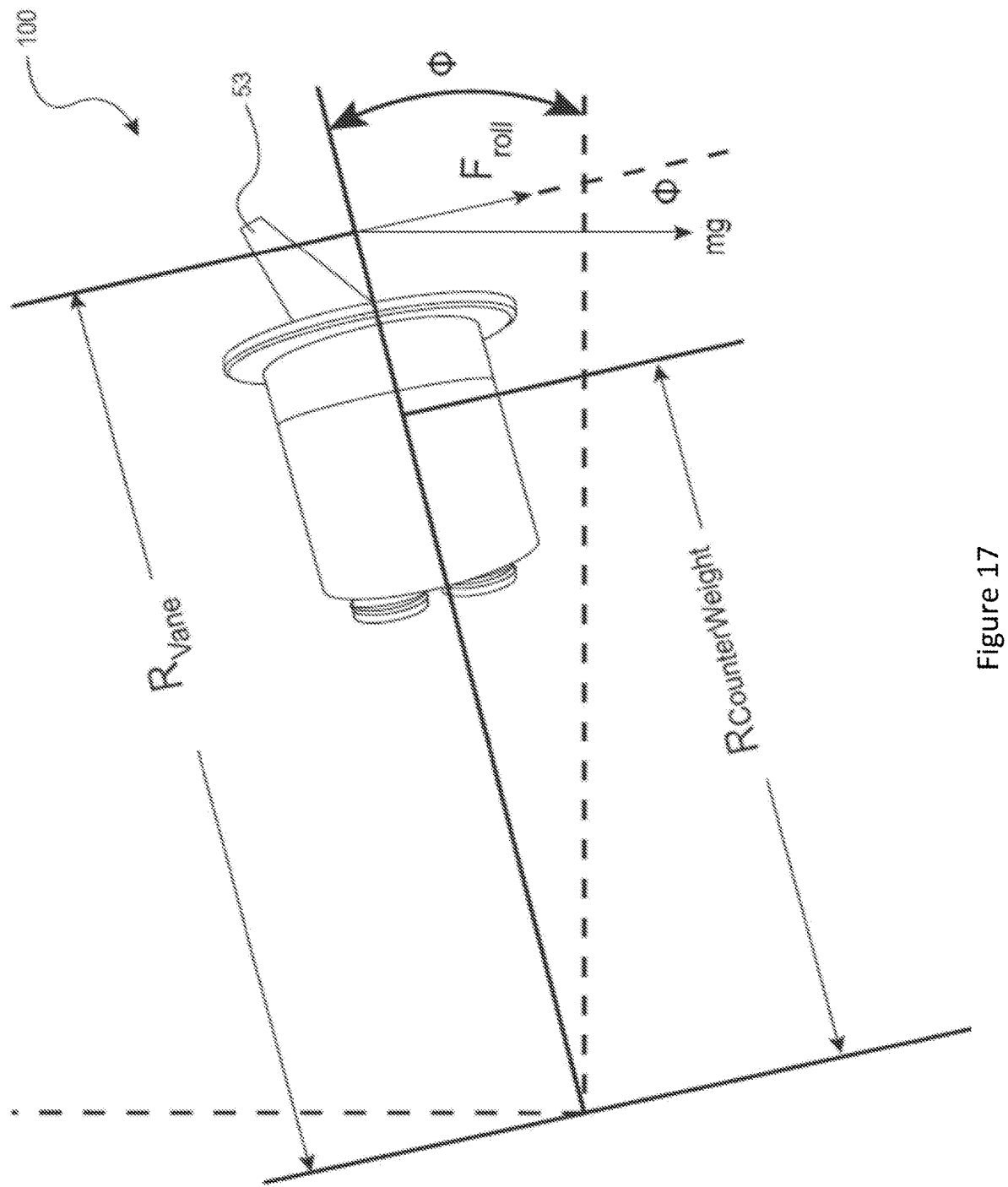
FIG. 17 illustrates a frame of reference for the aircraft airflow sensor probe according to FIG. 1.
Figure 18:
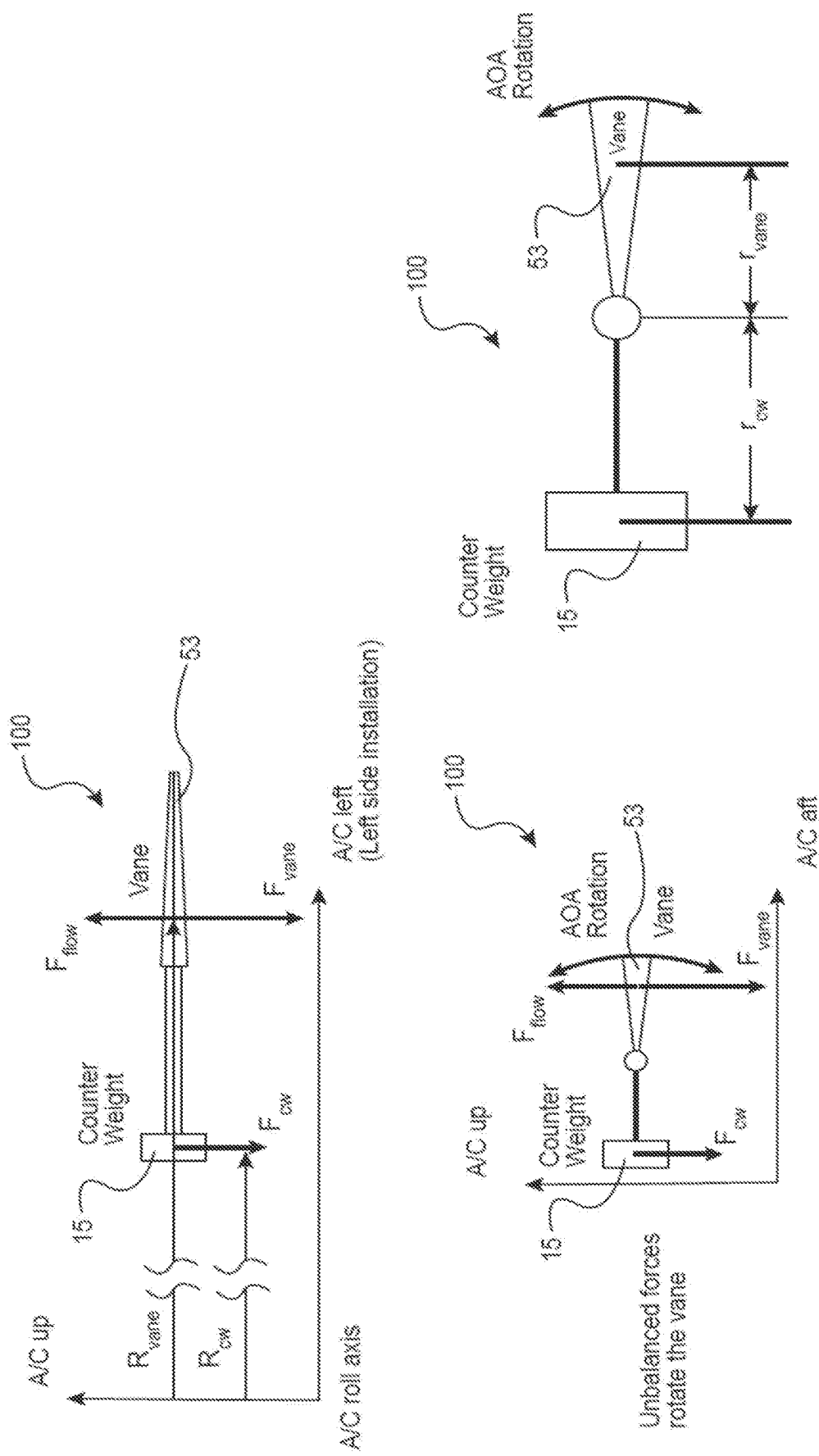
FIG. 18 illustrates frames of reference and forces experienced on portions of the aircraft airflow sensor probe according to FIG. 1.
Figure 19:
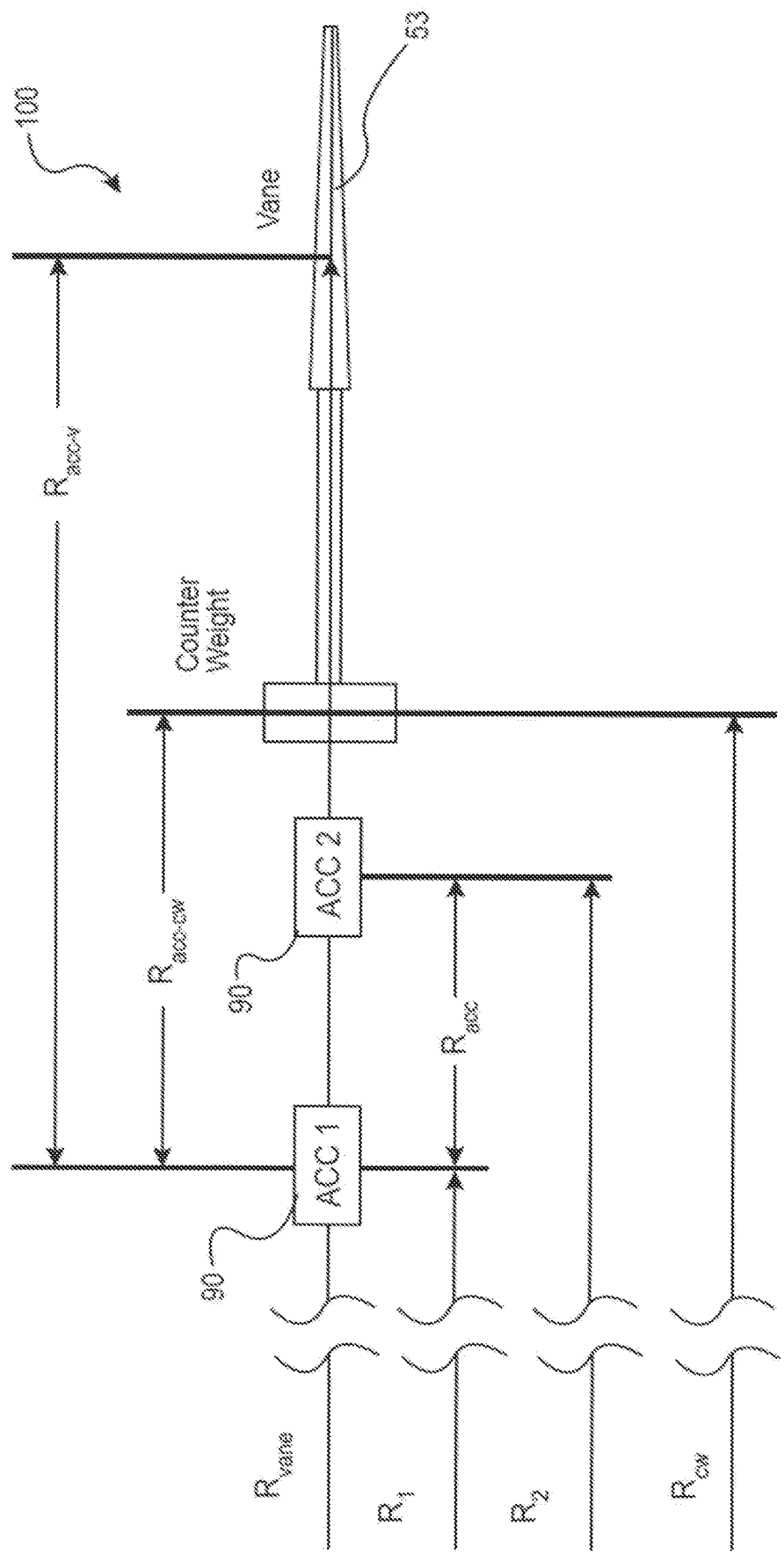
FIG. 19 illustrates a frame of reference, accelerometers, and forces experienced on portions of the aircraft airflow sensor probe according to FIG. 1.
Figure 20:
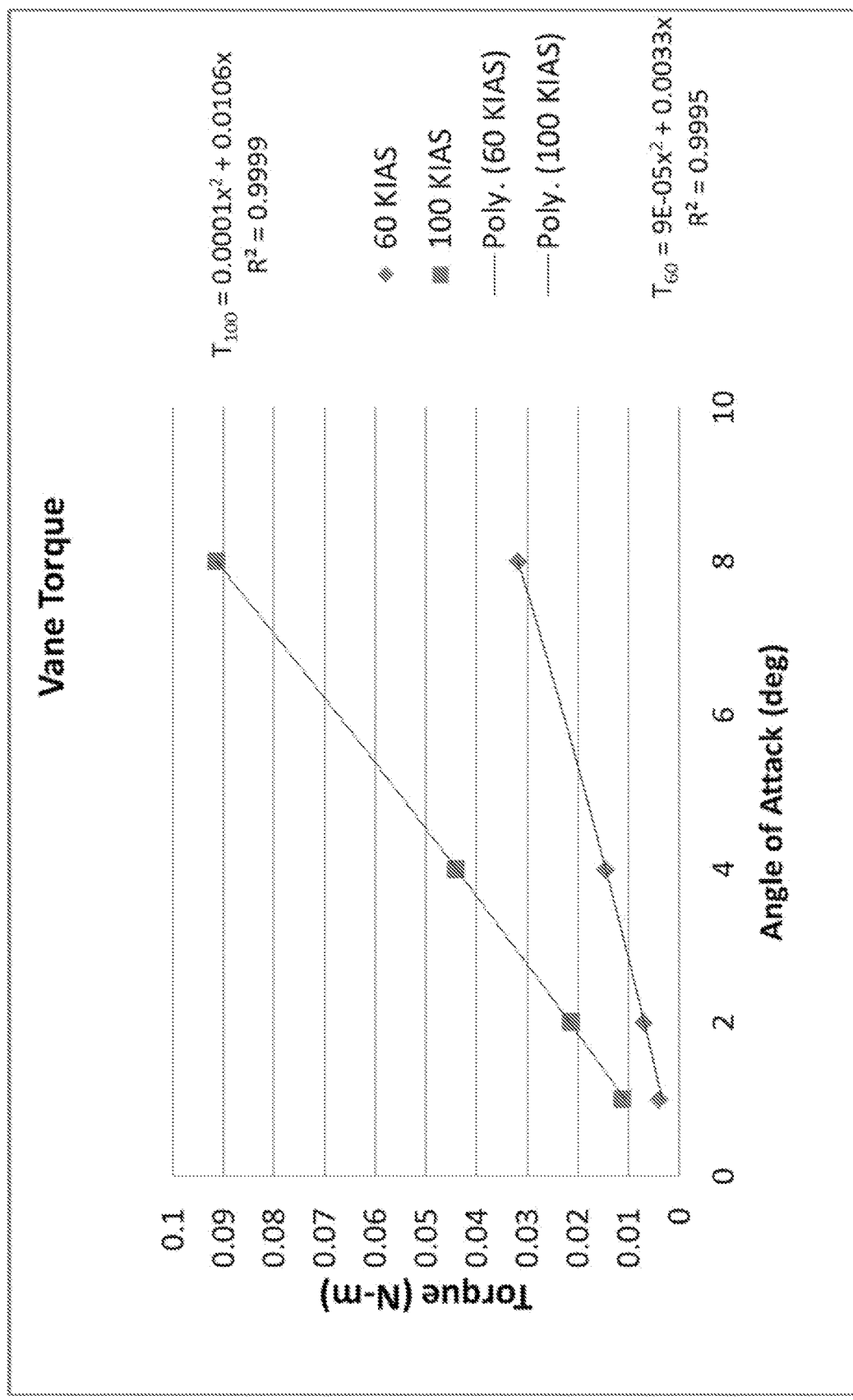
FIG. 20 is a graph of experimental data that includes torque versus angle of attack for an aircraft airflow sensor probe.
Figure 21:
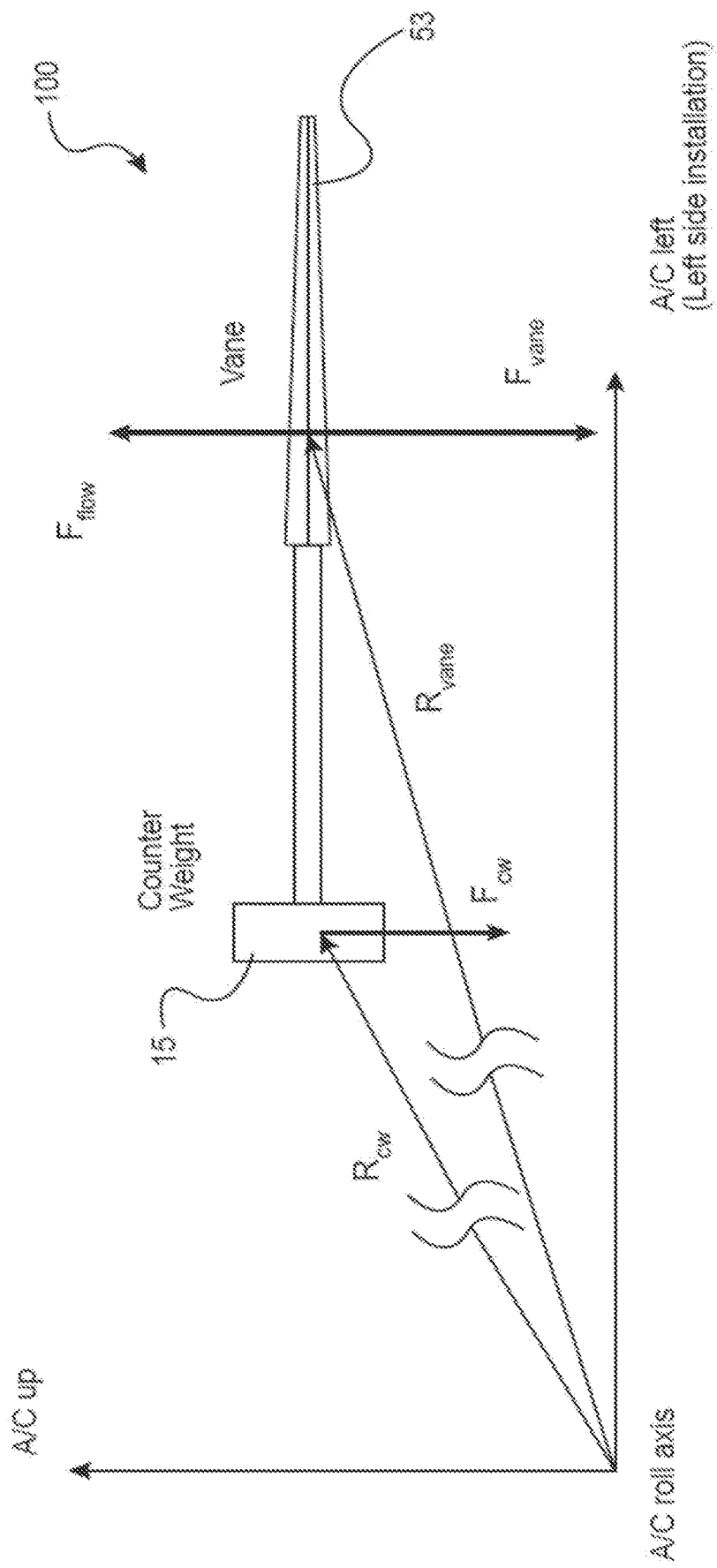
FIG. 21 illustrates frames of reference and forces experienced on portions of the aircraft airflow sensor probe according to FIG. 1.

FIG. 16 illustrates a frame of reference for an aircraft conducting pitch and roll maneuvers; FIG. 17 illustrates a frame of reference for the aircraft airflow sensor probe according to FIG. 1; FIG. 18 illustrates frames of reference and forces experienced on portions of the aircraft airflow sensor probe according to FIG. 1; FIG. 19 illustrates a frame of reference, accelerometers, and forces experienced on portions of the aircraft airflow sensor probe according to FIG. 1; FIG. 20 is a graph of experimental data that includes torque versus angle of attack for an aircraft airflow sensor probe; and FIG. 21 illustrates frames of reference and forces experienced on portions of the aircraft airflow sensor probe according to FIG. 1.

Angular Acceleration Effects on Indicated angle of attack (AOA)

As described above, the disclosed aircraft airflow sensor probe 100 corrects errors associated with various acceleration effects or aircraft movement on a measured angle of attack (AOA). The following explanation in view of FIGS. 16-21 provides an exemplary non-limiting basis for the correction of errors.

With reference to FIG. 16, when the aircraft maneuvers, for example either in pitch or roll, the aircraft airflow sensor probe 100 experiences a force gradient across its mechanism which results in greater forces on portions of the aircraft airflow sensor probe 100 that are further from an axis of rotation than those portions of the aircraft airflow sensor probe 100 that are closer to the axis of rotation. The effect is that the aircraft airflow sensor probe 100 that requires a counterweight 15 experiences more force on the vane assembly 53 than on the counterweight 15 and the vane assembly 53 becomes imbalanced.

Forces

With reference to FIG. 17, the differential force is easiest to explain for roll, since the axis of rotation is within the body of the aircraft. However, for brevity of disclosure, the differential force with respect to pitch is not analyzed in detail. However, the analysis would be analogous and/or commensurate to the analysis discussed below with respect to roll.

The force due to the acceleration angle is the product of the affected portions of the aircraft airflow sensor probe 100 and the angular acceleration and the radius. For this discussion, the fixed, non-rotating elements of the aircraft airflow sensor probe 100 may not be greatly affected, only the rotating parts. For simplicity, the discussion only considers two elements, the counterweight 15 and the vane assembly 53. In reality, the system is a more complicated continuous distribution of masses that rotate about the shaft 14 and/or shaft 18 of the vane assembly 53. The force due to angular acceleration on the vane assembly 53 alone may be considered as:

$$F_{\alpha vane} = R_{vane} \cdot m_{vane} \cdot \alpha$$

Where:

$$\alpha = (d^2\phi)/dt^2)$$

$m_{vane}$=Vane assembly 53 Mass $R_{vane}$ is the radius about which the vane assembly 53 center of gravity rotates.

The force on the counterweight 15 (cw) is the same, with a different radius and mass and may be considered as:

$$F_{\alpha cw} = R_{cw} \cdot m_{cw} \cdot \alpha$$

The force due to gravity that tends to rotate the vane assembly 53 about the AOA sensing axis of the aircraft airflow sensor probe 100 may be considered as:

$$F_g = m_{vane} \cdot g \cdot \cos(\phi)$$

So the net force tending to rotate the vane assembly 53 about the sensing axis may be considered as:

$$F_{vane} = R_{vane} \cdot m_{vane} \cdot \alpha + m_{vane} \cdot g \cdot \cos(\phi)$$

The same relationship applies for the counterweight 15 (cw) that may be considered as:

$$F_{cw} = R_{cw} \cdot m_{cw} \cdot \alpha + m_{cw} \cdot g \cdot \cos(\phi)$$

In a well-balanced aircraft airflow sensor probe 100, the vane assembly 53 and the counterweight 15 moments are equal.

AOA Sensor Components

FIG. 18 demonstrates that the force gradient caused by the difference in radii between the vane assembly 53 and the counterweight 15 under roll acceleration that will result in some deflection of the vane assembly 53. The same is true for pitch acceleration.

As indicated above, in a well-balanced aircraft airflow sensor probe 100, the internal moments on the vane assembly 53 are equal, thus the torques due to gravity are equal in magnitude and opposite in sign and may be considered as:

$$T_{cw} + T_{vane} = 0$$

$$T_{cw} = r_{cw} \cdot m_{cw} \cdot g, \text{ and}$$

$$T_{vane} = r_{vane} \cdot m_{vane} \cdot g$$

Consider the sign convention to be r is positive in the direction of the vane assembly 53 and negative in the direction of the counterweight 15, centered on the axis of rotation, so in FIG. 18, $r_{vane}$ is greater than zero and $r_{cw}$ is less than zero. In the presence of maneuvering acceleration, there are additional torques on the system components that may be considered as:

$$T_{\alpha cw} = r_{cw} (R_{cw} \cdot m_{cw} \cdot \alpha)$$

$$T_{\alpha vane} = r_{vane} (R_{vane} \cdot m_{vane} \cdot \alpha)$$

The net torque on the aircraft airflow sensor probe 100 rotation may be determined by:

$$T_{net} = T_{\alpha cw} + T_{\alpha vane} + T_{cw} + T_{vane} + T_{flow}$$

Since $T_{cw} + T_{vane} = 0$ $$T_{net} = T_{\alpha cw} + T_{\alpha vane} + T_{flow}$$

Or $$T_{net} = r_{cw}(R_{cw} \cdot m_{cw} \cdot \alpha) + r_{vane}(R_{vane} \cdot m_{vane} \cdot \alpha) + T_{flow}$$

Circular Motion

With reference to FIG. 19, the tangential acceleration of the counterweight 15 about the roll axis may be determined by:

$$a_{cw} = R_{cw} \cdot \alpha$$

and the vane:

$$a_{vane} = R_{vane} \cdot \alpha$$

If we consider that the mass of the counterweight 15 is known, the radius of the counterweight 15 on the aircraft airflow sensor probe 100 shaft 14 and/or shaft 18 is known and we measure the tangential acceleration at the counterweight 15, we can compute the torque caused by the aircraft roll motion without knowing the radius of the roll that may be determined by:

$$T_{cw} = r_{cw}(m_{cw} \cdot a_{cw})$$

and the vane assembly 53 may be determined by:

$$T_{vane} = r_{vane}(m_{vane} \cdot a_{vane})$$

The net torque becomes something that can be computed from locally measured data and sensor characteristics and may be determined by:

$$T_{net} = r_{cw}(m_{cw} \cdot a_{cw}) + r_{vane}(m_{vane} \cdot a_{vane}) + T_{flow}$$

With further reference to FIG. 19, consider the difference between the roll radius of the accelerometer 90 (90-1 (ACC1)) and the roll radius of the accelerometer 90 (90-2 (ACC2)) to be $R_{acc}$. We have:

$$a_{acc2} - a_{acc1} = (R_{acc1} + R_{acc}) \cdot \alpha - R_{acc1} \cdot \alpha$$

$$a_{acc2} - a_{acc1} = \alpha(R_{acc1} + R_{acc} - R_{acc1})$$

$$a_{acc2} - a_{acc1} = \alpha \cdot R_{acc}$$

In this case, the two accelerations can be measured and $R_{acc}$ is a constant characteristic of the aircraft airflow sensor probe 100.

$$(a_{acc2} - a_{acc1})/R_{acc} = \alpha$$

The net torque equation becomes:

$$T_{net} = r_{cw}(R_{cw} \cdot m_{cw} \cdot ((a_{acc2} - a_{acc1})/R_{acc})) + r_{vane}(R_{vane} \cdot m_{vane} \cdot (a_{acc2} - a_{acc1})/R_{acc}) + T_{flow}$$

Substituting the constants:

$$\ell = r_{cw}((R_{cw} \cdot m_{cw})/R_{acc}), \text{ and}$$

$$K = r_{vane}((R_{vane} \cdot M_{vane})/R_{acc})$$

Which it simplifies the torque equation to be:

$$T_{net} = \ell(a_{acc2} - a_{acc1}) + K(a_{acc2} - a_{acc1}) + T_{flow}$$

Angular Error

For constant airspeed, the aerodynamic torque increases as the angular displacement increases from the point where the vane assembly 53 is correctly aligned with the flow. The angular error will be the angle at which the flow torque and the inertial torque are equal:

$$\ell((a_{acc2} - a_{acc1})) + K(a_{acc2} - a_{acc1}) = T_{flow}(AOA)$$

With reference to FIG. 20, using roll data from the AERO Vodochody L-39 we estimate the torque induced by the roll to be 0.0271 Newton-meters (N-m). Solving the aerodynamic torque function at 60 Knots-Indicated Airspeed (KIAS) produces an angle of 6.9 Degrees, and at 100 KIAS an angle of 2.9 degrees.

Pitch
Rate 0.314 rad/sec
Acceleration 1.5 rad/s$^2$
Moment 3.83 meters (m) (distance from aircraft center of gravity (A/C CG))
Roll
Rate 4.538 rad/sec
Acceleration 12 rad/s$^2$
Moment 0.49 m (distance from A/C CG)
Implementation The calibration table, algorithm, lookup table and/or the like implemented by the AOA processor 28 or another processor that generates the correction factor may be generated or implemented based on integrating the computed torques to find the inertially induced angle component. Thereafter, subtracting the integrated torque from the sensor indicated angle to obtain the flow angle. Additionally, noise issues may be addressed by the calibration table, algorithm, lookup table and/or the like implemented by the AOA processor 28 or another processor. Alternatively, those issues may be addressed by filtering.

Additional Considerations

With reference to FIG. 21, in some aspects, the roll axis may not be parallel to the vane assembly 53 axis of rotation. A similar analysis to that provided above may consider centripetal force as well and find a solution that does not depend on an aircraft installation radius ($R_{cw}$ and $R_{vane}$).

Figure 22:
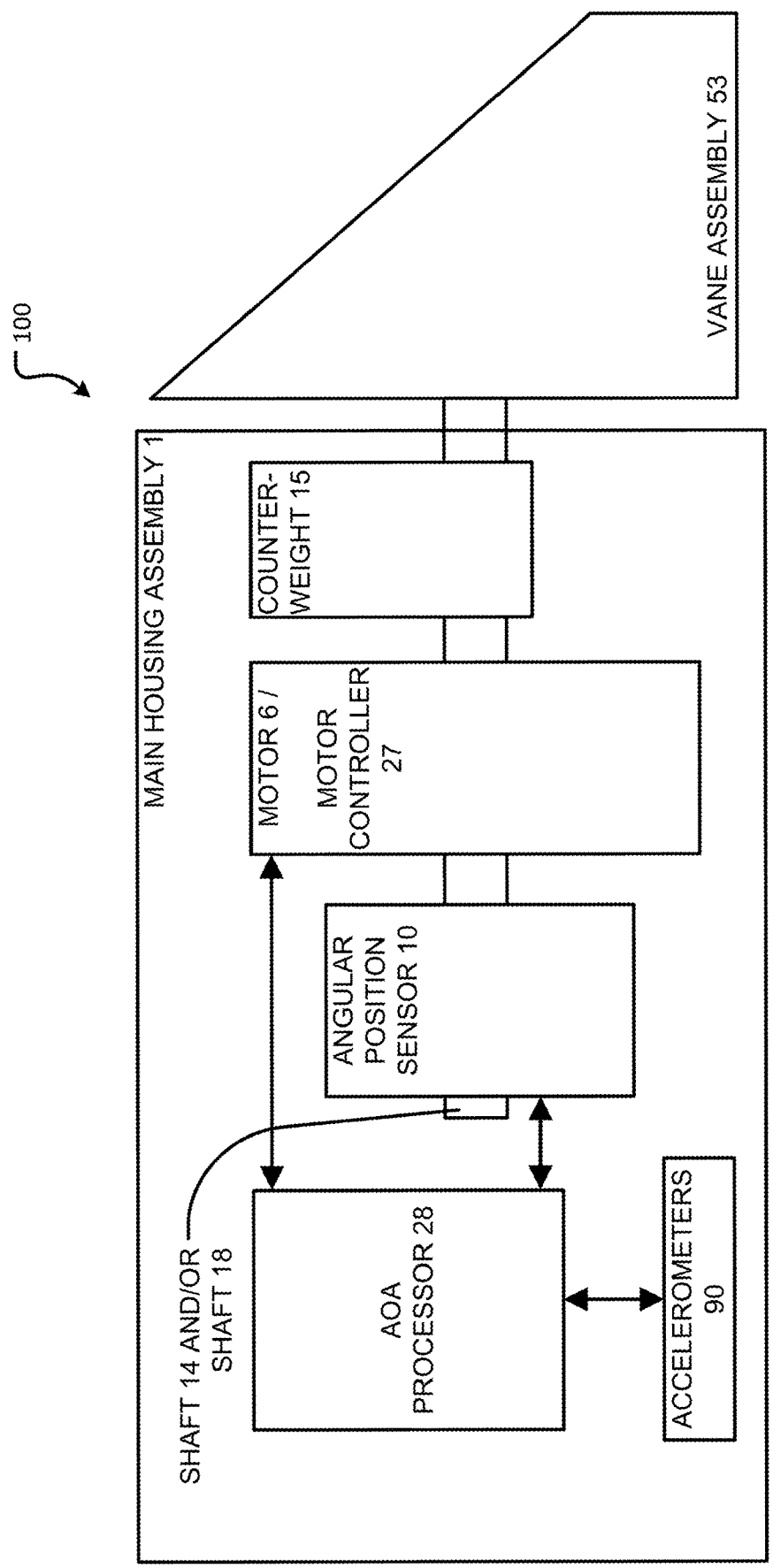
FIG. 22 illustrates another schematic of the aircraft airflow sensor probe according to the disclosure.

FIG. 22 illustrates another schematic of the aircraft airflow sensor probe according to the disclosure.

In particular, FIG. 22 illustrates an aspect where the aircraft airflow sensor probe 100 may further include a motor 6 that may be connected to the shaft 14 and/or the shaft 18 supporting rotation of the vane assembly 53. Moreover, the aircraft airflow sensor probe 100 illustrated in FIG. 22 may include any or all other aspects, components, and/or the like of the disclosure as described herein.

In some aspects, the motor 6 may provide at least two functions: correct a position the vane assembly 53 based on a correction factor in response to aircraft movement; and position the vane assembly 53 at known angles during Pilot Activated Test (Initiated Build-In-Test (IBIT) that may include reading and verifying the angle with the angular position sensor 10). In a particular aspect, the motor 6 may be connected to the shaft 14 and/or the shaft 18 to provide a controlled rotation of the vane assembly 53 to correctly position the vane assembly 53 based on aircraft movement information and/or aircraft information. In one aspect, the motor 6 may be controlled by a motor controller 27 in response to the AOA processor 28.

As described above, the aircraft airflow sensor probe 100 may include the one or more accelerometers 90 and the AOA processor 28 may receive the values output from the accelerometers 90 for calculation of aircraft movement as described herein. In one aspect, the AOA processor 28 may receive the values output from the accelerometers 90 for calculation of a pitch rate and/or a roll rate of the aircraft.

In one aspect, based on the aircraft movement, a correction factor may be generated. In one aspect, a correction factor may be generated based on a pitch rate and/or a roll rate of the aircraft. In one aspect, the AOA processor 28 may calculate the correction factor. In one aspect, another processor may calculate the correction factor. The correction factor may then be used to control the motor 6 to correctly reposition the vane assembly 53 of the aircraft airflow sensor probe 100 based on the aircraft movement. In one aspect, the correction factor may be a function of a pitch rate and/or a roll rate of the aircraft. The aircraft movement may be applied to a calibration table, algorithm, lookup table and/or the like by the AOA processor 28 or another processor that generates the correction factor that may be used to control the motor 6 to move the vane assembly 53 so that the angle of attack (AOA) measurement from the vane assembly 53 is more accurate. In one aspect, the correction factor is generated by the AOA processor 28.

In further aspects, the aircraft airflow sensor probe 100 may also sense aircraft information, such as airspeed. In one aspect, the correction factor may be generated based on the aircraft movement and aircraft information, such as airspeed. In one aspect, based on a pitch rate and/or a roll rate of the aircraft and an airspeed, a correction factor may be generated. In one aspect, the correction factor may be generated by the AOA processor 28. In one aspect, the correction factor may be generated by another processor. Thereafter, the correction factor may be used to control the motor 6 to move the vane assembly 53 based on the aircraft movement and aircraft information so that the angle of attack (AOA) measurement from the vane assembly 53 is more accurate.

The motor 6 may be implemented as any type electrical motor. In one aspect, the motor 6 may be implemented as a brushless permanent magnet motor. In another aspect, the motor 6 may be implemented as a frameless motor where the chassis of the aircraft airflow sensor probe 100 functions as the frame or housing of the motor. In a particular aspect, the motor 6 may be configured to receive commands to provide a torque to an associated motor shaft, the shaft 14, and/or the shaft 18 that may form part of the aircraft airflow sensor probe 100 to move the vane assembly 53 based on the aircraft movement and aircraft information so that the angle of attack (AOA) measurement from the vane assembly 53 is more accurate.

Figure 23:
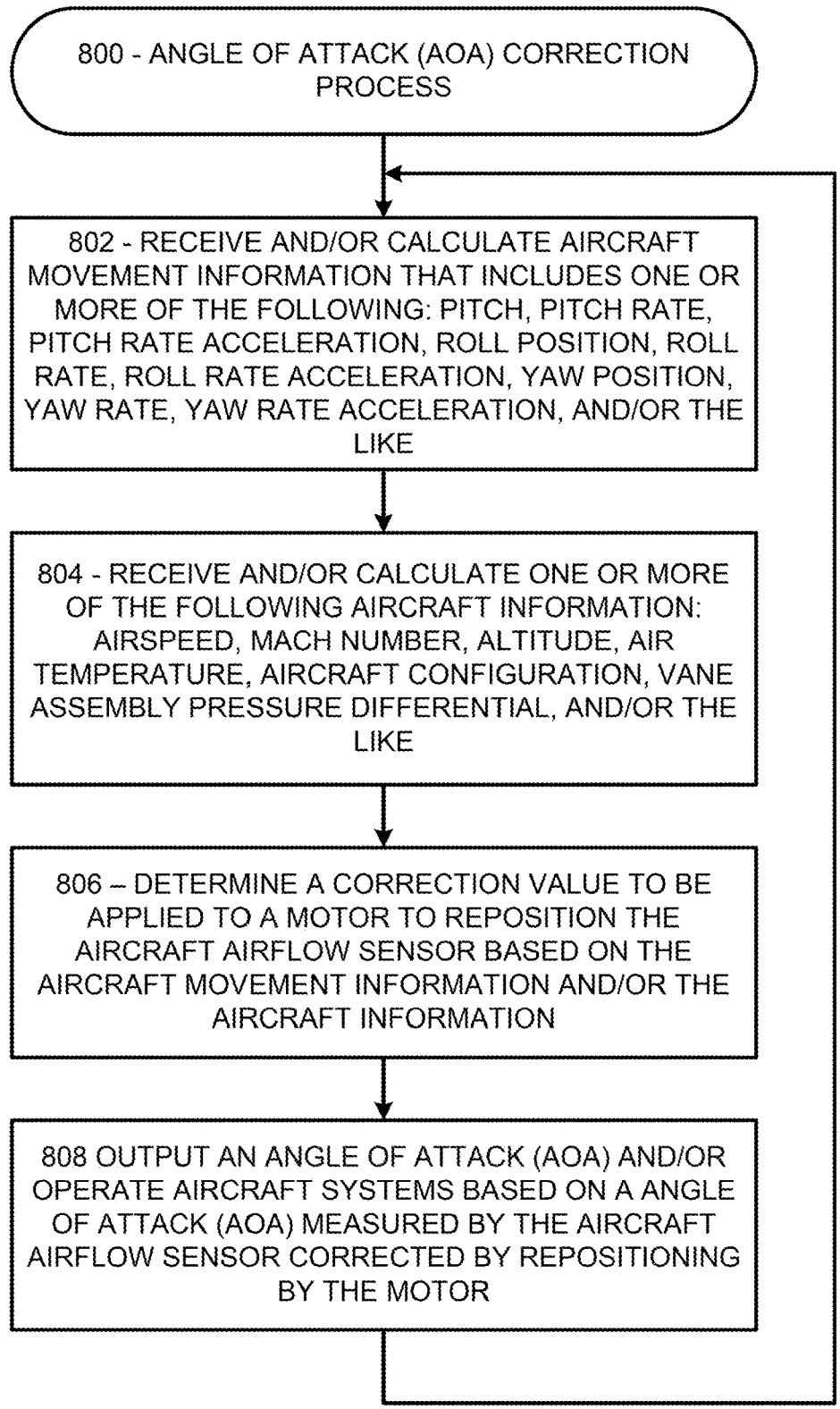
FIG. 23 illustrates an operational process implemented by the aircraft airflow sensor probe according to FIG. 22.

FIG. 23 illustrates an operational process implemented by the aircraft airflow sensor probe according to FIG. 22.

In particular, FIG. 23 illustrates an angle of attack (AOA) correction process 800. In one aspect, the angle of attack (AOA) correction process 800 may be executed by the AOA processor 28. In one aspect, the angle of attack (AOA) correction process 800 may be executed by the AOA processor 28 and another processor. In one aspect, the angle of attack (AOA) correction process 800 may be executed by another processor. In particular, it should be noted that the angle of attack (AOA) correction process 800 is merely exemplary and may be modified consistent with the various aspects disclosed herein. Moreover, the angle of attack (AOA) correction process 800 may be performed in a different order consistent with the aspects described above. Moreover, the angle of attack (AOA) correction process 800 may be modified to have more or fewer process steps consistent with the various aspects disclosed herein.

In box 802, the aircraft airflow sensor probe 100 may receive and/or calculate aircraft movement information. The aircraft movement information may be received and/or calculated from sensor readings from the one or more accelerometers 90. The aircraft movement information may include pitch, pitch rate, pitch rate acceleration, roll position, roll rate, roll rate acceleration, yaw position, yaw rate, yaw rate acceleration, and/or the like. In one aspect, the aircraft movement information may include pitch rate, roll rate, and/or the like. In one aspect, the aircraft movement information may include pitch rate and/or roll rate. In one aspect, the aircraft movement information may include pitch rate and roll rate.

In box 804, the aircraft airflow sensor probe 100 may receive and/or calculate one or more of the following aircraft information: airspeed, Mach number, altitude, air temperature, aircraft configuration, vane assembly pressure differential, angle of attack (AOA), rate of change of the angle of attack (AOA), and/or the like.

In this regard, the airspeed, Mach number, altitude, and vane assembly pressure differential aircraft information may be obtained from the air pressure sensors 80 associated with the air pressure ports 68, 70, and 72 as described herein. Additionally, the outputs of the air pressure sensors 80 may be processed in the AOA processor 28 to generate the airspeed, Mach number, altitude, and vane assembly pressure differential aircraft information. Alternatively, the airspeed, Mach number, and other information may be received by the aircraft airflow sensor probe 100 through electrical interfaces from the aircraft as described below.

In box 806, the aircraft airflow sensor probe 100 and/or the AOA processor 28 may determine a correction value to be applied to the motor 6 to correctly reposition the vane assembly 53 based on the aircraft movement information and/or the aircraft information.

In box 808, the aircraft airflow sensor probe 100 and/or the AOA processor 28 may output an accurate measured angle of attack (AOA) based on the correction value applied to the motor 6 to correctly reposition the vane assembly 53 based on the aircraft movement information and/or the aircraft information.

Accordingly, the disclosure has set forth an aircraft airflow sensor probe 100 that is more accurate, less susceptible to aircraft maneuvers that include high G forces and/or low speed. Increased accuracy of the aircraft airflow sensor probe 100 may provide more accurate information to the pilot and/or aircraft, which will provide greater safety to the aircraft pilot and the aircraft passengers.

As described herein, a g-force of 1 g may be defined to be equal to the conventional value of gravitational acceleration on Earth. As described herein, high G forces or higher G forces may be defined as G forces in the range of 1.5 g-12 g, 2 g-12 g, 3 g-12 g, 4 g-12 g, 5 g-12 g, 6 g-12 g, or 7 g-12 g. As described herein, low speeds may be defined as speeds of 90% to 300%, 90% to 120%, 90% to 150%, 90% to 200%, or 90% to 250%, of an aircraft stall speed.

Connected as described herein may include coupling or connections that may include leads, wire bonding, an adhesive, soldering, sintering, eutectic bonding, thermal compression bonding, ultrasonic bonding/welding, a clip component, and/or the like as described herein. The connection may be through intervening structures or components or the connection may be a direct connection.

The adhesive of the disclosure may be utilized in an adhesive bonding process that may include applying an intermediate layer to connect surfaces to be connected. The adhesive may be organic or inorganic; and the adhesive may be deposited on one or both surfaces of the surface to be connected. The adhesive may be utilized in an adhesive bonding process that may include applying adhesive material with a particular coating thickness, at a particular bonding temperature, for a particular processing time while in an environment that may include applying a particular tool pressure. In one aspect, the adhesive may be a conductive adhesive, an epoxy-based adhesive, a conductive epoxy-based adhesive, and/or the like.

The solder of the disclosure may be utilized to form a solder interface that may include solder and/or be formed from solder. The solder may be any fusible metal alloy that may be used to form a bond between surfaces to be connected. The solder may be a lead-free solder, a lead solder, a eutectic solder, or the like. The lead-free solder may contain tin, copper, silver, bismuth, indium, zinc, antimony, traces of other metals, and/or the like. The lead solder may contain lead, other metals such as tin, silver, and/or the like. The solder may further include flux as needed.

The sintering of the disclosure may utilize a process of compacting and forming a solid mass of material by heat and/or pressure. The sintering process may operate without melting the material to the point of liquefaction. The sintering process may include sintering of metallic powders. The sintering process may include sintering in a vacuum. The sintering process may include sintering with the use of a protective gas.

The eutectic bonding of the disclosure may utilize a bonding process with an intermediate metal layer that may form a eutectic system. The eutectic system may be used between surfaces to be connected. The eutectic bonding may utilize eutectic metals that may be alloys that transform from solid to liquid state, or from liquid to solid state, at a specific composition and temperature without passing a two-phase equilibrium. The eutectic alloys may be deposited by sputtering, dual source evaporation, electroplating, and/or the like.

The ultrasonically welding of the disclosure may utilize a process whereby high-frequency ultrasonic acoustic vibrations are locally applied to components being held together under pressure. The ultrasonically welding may create a solid-state weld between surfaces to be connected. In one aspect, the ultrasonically welding may include applying a sonicated force.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An aircraft airflow sensor probe comprising:
a vane assembly configured to sense a direction of local airflow outside an aircraft;
a shaft configured to rotatably hold the vane assembly and allow rotational movement of the vane assembly;
at least one accelerometer configured to detect aircraft movement;
a sensor configured to sense and output a rotational position of the vane assembly;
an angle of attack processor configured to determine at least a measured angle of attack of the aircraft based on the rotational position of the vane assembly;
the at least one accelerometer configured to provide aircraft movement data to the angle of attack processor; and
the angle of attack processor further configured to determine a correction value based on the aircraft movement data provided by the at least one accelerometer and output a corrected angle of attack of the aircraft.

2. The aircraft airflow sensor probe according to claim 1 wherein the aircraft movement comprises at least one of the following: pitch, pitch rate, pitch rate acceleration, roll position, roll rate, roll rate acceleration, yaw position, yaw rate, yaw rate acceleration.

3. The aircraft airflow sensor probe according to claim 2 wherein the at least one accelerometer is configured to measure at least one of the following: pitch, pitch rate, pitch rate acceleration, roll position, roll rate, roll rate acceleration, yaw position, yaw rate, yaw rate acceleration.

4. The aircraft airflow sensor probe according to claim 1 wherein the aircraft movement comprises at least one of the following: pitch rate and roll rate.

5. The aircraft airflow sensor probe according to claim 4 wherein the at least one accelerometer is configured to measure at least one of the following: pitch rate and roll rate.

6. The aircraft airflow sensor probe according to claim 1 wherein the aircraft movement comprises at least pitch rate and roll rate.

7. The aircraft airflow sensor probe according to claim 6 wherein the at least one accelerometer is configured to measure at least pitch rate and roll rate.

8. The aircraft airflow sensor probe according to claim 1 further comprising:
at least one air pressure sensor configured to determine an air pressure received by an air pressure sensor port,
wherein the air pressure comprises at least one of the following aircraft information: a static air pressure, an airflow velocity, and a pressure differential between an upper side of the vane assembly and a lower side of the vane assembly.

9. The aircraft airflow sensor probe according to claim 8 wherein the angle of attack processor is further configured to determine a correction value based on the aircraft movement data provided by the at least one accelerometer and the aircraft information and output a corrected angle of attack of the aircraft.

10. An aircraft airflow sensor probe comprising:
a vane assembly configured to sense a direction of local airflow outside an aircraft;
a shaft configured to rotatably hold the vane assembly and allow rotational movement of the vane assembly;
at least one accelerometer configured to detect aircraft movement;
a sensor configured to sense and output a rotational position of the vane assembly;
an angle of attack processor configured to determine at least a measured angle of attack of the aircraft based on the rotational position of the vane assembly;
the at least one accelerometer configured to provide aircraft movement data to the angle of attack processor;
the angle of attack processor further configured to determine a correction value based on the aircraft movement data provided by the at least one accelerometer and output a corrected angle of attack of the aircraft; and
at least one air pressure sensor configured to determine an air pressure received by an air pressure sensor port for calculation of aircraft information that includes at least airspeed,
wherein the angle of attack processor is further configured to determine a correction value based on the aircraft movement data provided by the at least one accelerometer and the aircraft information that includes at least airspeed and output a corrected angle of attack of the aircraft.

11. A process of implementing an aircraft airflow sensor probe comprising:
configuring an aircraft with a vane assembly;
allowing rotational movement of the vane assembly with a shaft configured to rotatably hold the vane assembly;
sensing a direction of local airflow outside the aircraft with the vane assembly;
detecting aircraft movement with at least one accelerometer;
sensing and outputting a rotational position of the vane assembly with a sensor;
determining at least a measured angle of attack of the aircraft based on the rotational position of the vane assembly with an angle of attack processor;
providing aircraft movement data to the angle of attack processor with the at least one accelerometer; and
determining a correction value based on the aircraft movement data provided by the at least one accelerometer and outputting a corrected angle of attack of the aircraft with the angle of attack processor.

12. The process of implementing the aircraft airflow sensor probe according to claim 11 wherein the aircraft movement comprises at least one of the following: pitch, pitch rate, pitch rate acceleration, roll position, roll rate, roll rate acceleration, yaw position, yaw rate, yaw rate acceleration.

13. The process of implementing the aircraft airflow sensor probe according to claim 12 wherein the at least one accelerometer is configured to measure at least one of the following: pitch, pitch rate, pitch rate acceleration, roll position, roll rate, roll rate acceleration, yaw position, yaw rate, yaw rate acceleration.

14. The process of implementing the aircraft airflow sensor probe according to claim 11 wherein the aircraft movement comprises at least one of the following: pitch rate and roll rate.

15. The process of implementing the aircraft airflow sensor probe according to claim 14 wherein the at least one accelerometer is configured to measure at least one of the following: pitch rate and roll rate.

16. The process of implementing the aircraft airflow sensor probe according to claim 11 wherein the aircraft movement comprises at least pitch rate and roll rate.

17. The process of implementing the aircraft airflow sensor probe according to claim 16 wherein the at least one accelerometer is configured to measure at least pitch rate and roll rate.

18. The process of implementing the aircraft airflow sensor probe according to claim 11 further comprising:
at least one air pressure sensor configured to determine an air pressure received by an air pressure sensor port, wherein the air pressure comprises at least one of the following aircraft information: a static air pressure, an airflow velocity, and a pressure differential between an upper side of the vane assembly and a lower side of the vane assembly.

19. The process of implementing the aircraft airflow sensor probe according to claim 18 wherein the angle of attack processor is further configured to determine a correction value based on the aircraft movement data provided by the at least one accelerometer and the aircraft information and output a corrected angle of attack of the aircraft.

20. A process of implementing an aircraft airflow sensor probe comprising:
configuring an aircraft with a vane assembly;
allowing rotational movement of the vane assembly with a shaft configured to rotatably hold the vane assembly;
sensing a direction of local airflow outside the aircraft with the vane assembly;
detecting aircraft movement with at least one accelerometer;
sensing and outputting a rotational position of the vane assembly with a sensor;
determining at least a measured angle of attack of the aircraft based on the rotational position of the vane assembly with an angle of attack processor;
providing aircraft movement data to the angle of attack processor with the at least one accelerometer;
determining a correction value based on the aircraft movement data provided by the at least one accelerometer and outputting a corrected angle of attack of the aircraft with the angle of attack processor; and
at least one air pressure sensor configured to determine an air pressure received by an air pressure sensor port for calculation of aircraft information that includes at least airspeed,
wherein the angle of attack processor is further configured to determine a correction value based on the aircraft movement data provided by the at least one accelerometer and the aircraft information that includes at least airspeed and output a corrected angle of attack of the aircraft.

* * * * *